United States Patent [19]
Hettinger, Jr.

[11] Patent Number: 6,069,106
[45] Date of Patent: May 30, 2000

[54] PROCESS AND COMPOSITIONS FOR MN CONTAINING CATALYST FOR CARBO-METALLIC HYDROCARBONS

[76] Inventor: William P Hettinger, Jr., 605 Via Verona, Deerfield Beach, Fla. 33442

[21] Appl. No.: 08/731,813

[22] Filed: Oct. 21, 1996

Related U.S. Application Data

[63] Continuation-in-part of application No. 08/398,029, Mar. 3, 1994, Pat. No. 5,641,395.

[51] Int. Cl.⁷ .................................................. B01J 29/076
[52] U.S. Cl. ................................. 502/64; 502/65; 502/66; 502/71; 502/77; 502/79
[58] Field of Search .................................. 502/67, 64, 65, 502/66, 71, 77, 79; 208/113

[56] References Cited

U.S. PATENT DOCUMENTS

| | | | |
|---|---|---|---|
| 4,267,072 | 5/1981 | Vasalos | 502/64 |
| 4,382,023 | 5/1983 | Mulaskey | 502/79 |
| 4,432,890 | 2/1984 | Beck et al. | 502/62 |
| 4,485,184 | 11/1984 | Hettinger, Jr. et al. | 502/67 |
| 4,612,298 | 9/1986 | Hettinger, Jr. et al. | 502/65 |
| 4,668,655 | 5/1987 | Lewis et al. | 502/304 |
| 4,956,075 | 9/1990 | Angevine et al. | |
| 5,051,164 | 9/1991 | Herbst et al. | 208/120 |
| 5,106,486 | 4/1992 | Hettinger | 208/113 |
| 5,198,098 | 3/1993 | Hettinger | |
| 5,641,395 | 6/1997 | Hettinger, Jr. et al. | 208/113 |
| 5,686,370 | 11/1997 | Romero et al. | 502/77 |

FOREIGN PATENT DOCUMENTS

WO 92/07044  4/1992  WIPO.

OTHER PUBLICATIONS

Wm. P. Hettinger Jr. Magnetic and Chemical Properties of Mag. Sep'd . . . Catalysts laden with Iron etc. Catalysis Today, 13 (1992) pp. 157–189 Elsevier Science Publishers (Amsterdam).

*Primary Examiner*—Tom Dunn
*Attorney, Agent, or Firm*—Richard Coale Willson, Jr.

[57] ABSTRACT

An improved manganese and/or chromium-promoted catalytic process, catalyst and method of manufacture for heavy hydrocarbon conversion, optionally in the presence of nickel and vanadium on the catalyst and in the feed stock, to produce lighter molecular weight fractions, including lower olefins and higher isobutane than normally produced. This process is based on the discovery that two "magnetic hook" elements, namely manganese and chromium, previously employed as magnetic enhancement agents to facilitate removal of old catalyst, or to selectively retain expensive catalysts, can also themselves function as selective cracking catalysts, particularly when operating on feeds containing significant amounts of nickel and vanadium, and especially where economics require operating with high nickel- and vanadium-contaminated and containing catalysts. Under such conditions, these promoted catalysts are more hydrogen and coke selective, have greater activity, and maintain that activity and superior selectivity in the presence of large amounts of contaminant metal, while also making more gasoline at a given conversion.

24 Claims, 12 Drawing Sheets

PROCESS AND COMPOSITIONS FOR MN CONTAINING CATALYST FOR CARBO-METALLIC HYDROCARBONS

CROSS REFERENCE TO RELATED APPLICATIONS

This application is a continuation-in-part of U.S. patent application Ser. No. 08/398,029, filed Mar. 3, 1994, now U.S. Pat. No. 5,641,395 and comprises claims required to be divided out from that application, and is related to U.S. patent application Ser. No. 08/326,982, filed Oct. 21, 1994, now U.S. Pat. No. 5,538,624.

BACKGROUND OF THE INVENTION

I. Field of the Invention

This invention relates to the field of adding manganese and/or chromium to hydrocarbon cracking catalysts, generally classified in Class 208, subclass 253 of the United States and in International Class C10G-29/D4.

II. Description of the Prior Art

U.S. Pat. No. 4,412,914 to Hettinger et al. is understood to remove coke deposits on sorbents by decarbonizing and demetalizing with additives including manganese (claim 4, column 26).

U.S. Pat. No. 4,414,098 to Zandona et al. uses additives for vanadium management on catalysts (column 15, line 6).

U.S. Pat. No. 4,432,890 to Beck et al. mobilizes vanadia by addition of manganese, inter alia, Table A; column 9, line 35–48; column 10, line 40; and column 27, line 3; Table Y; etc.

U.S. Pat. No. 4,440,868 to Hettinger et al. refers to selected metal additives in column 11, line 20, but does not apparently expressly mention Mn.

U.S. Pat. No. 4,450,241 to Hettinger et al. uses metal additives for endothermic removal of coke deposited on catalytic materials and includes manganese as an example of the additive (colunnn 11, Table C).

U.S. Pat. No. 4,469,588 to Hettinger et al. teaches immobilization of vanadia during visbreaking and adds manganese to sorbent materials (column 11, lines 1–13, line 53 and line 65; column 23, line 59 and line 20; claim 1 and claim 17.

U.S. Pat. No. 4,485,184 to Hettinger et al. is understood to teach that trapping of metals deposited on catalytic materials includes manganese as an additive (column 8, line 32; column 10, line 50, Table A; column 11, line 34; column 29, line 55, Table Z; column 31; column 32; claims 5–9.

U.S. Pat. No. 4,508,839 to Zandona et al. mentions metal additives including manganese at column 17, line 44 for the conversion of carbo-metallic oils.

U.S. Pat. No. 4,513,093 to Beck et al. immobilizes vanadia deposited on sorbent materials by additives, including manganese; column 9, line 35, Table A; column 10, lines 8–9; column 10, line 21.

U.S. Pat. No. 4,515,900 to Hettinger et al. is understood to teach that additives, including Mn, are useful in visbreaking of carbo-metallic oils (column 10, line 64 and column 23, line 52, Table E; column 25, line 13, Table 5.

U.S. Pat. No. 4,549,958 to Beck et al. teaches immobilization of vanadia on sorbent material during treatment of carbo-metallic oils. Additives include manganese mentioned at column 9, line 37, Table A; column 10, line 10; column 10, line 21; column 21, line 27, Table Y; column 21, line 56, Table Z; claim 37–38.

U.S. Pat. No. 4,561,968 to Beck et al. is understood to teach carbo-metallic oil conversion catalyst with zeolite Y-containing catalyst includes immobilization by manganese; column 14, line 43.

U.S. Pat. No. 4,612,298 to Hettinger et al. teaches manganese vanadium getter mentioned at column 14, line 31–32.

U.S. Pat. No. 4,624,773 to Hettinger et al. is understood to teach large pore catalysts for heavy hydrocarbon conversion and mentions manganese at column 18, line 27.

U.S. Pat. No. 4,750,987 to Beck et al. teaches immobilization of vanadia deposited on catalysts with metal additives including manganese; column 9, line 10; column 11, line 6, Table A; column 11, lines 47–49; column 11, lines 67; column 24, lines 14–25; column 28, line 52, Table Y.

U.S. Pat. No. 4,877,514 to Hettinger et al. teaches the incorporation of selected metal additives, including manganese, which complex with vanadia to for in higher melting mixtures; column 10, lines 43–49; column 14, lines 34–35; column 29, line 37; claims 2, 10 and 13.

U.S. Pat. No. 5,106,486 to Hettinger teaches the addition of magnetically active moieties, including manganese, for magnetic beneficiation of particulates in fluid bed hydrocarbon processing; column 4, line 64; Claims 1, 2, 11, 32, and 44–48.

U.S. Pat. No. 5,198,098 to Hettinger uses magnetic separation of old from new equilibrium particles by means of manganese addition (see claims 1–30).

U.S. Pat. No. 5,230,869 to Hettinger et al. is understood to teach the addition of magnetically active moieties for magnetic beneficiation of particulates in fluid bed hydrocarbon processing; column 5, line 4 and claim 1.

U.S. Pat. No. 5,364,827 to Hettinger et al. teaches the composition comprising magnetically active moieties for magnetic beneficiation of particulates in fluid bed hydrocarbon processing; column 5, line 4 and claim 5.

U.S. Pat. No. 4,836,914 to Inoue et al. mentions magnetic separation of iron content in petroleum mineral oil but is not understood to mention manganese.

U.S. Pat. No. 4,956,075 to Angevine et al. adds manganese during the manufacture of large pore crystalline molecular sieve catalysts and particularly uses a manganese ultra stable Y in catalytic cracking of hydrocarbons.

U.S. Pat. No. 5,358,630 to Bertus et al. mentions manganese in claims 28 and 40, but not in the specification. The patent relates primarily to methods for " . . . contacting . . . catalyst with a reducing gas under conditions suitable countering effects of contaminating metals thereon and employing at least a portion of said reduced catalysts in cracking said hydrocarbon feed" (column 7, lines 10–12).

U.S. Pat. No. 2,575,258 to Corneil et al. mentions manganese as accumulating in the catalysts as a result of erosion of equipment (column 3, line 34).

U.S. Pat. No. 3,977,963 to Readal et al. mentions manganese nitrate and manganese benzoate and other manganese compounds, e.g., in the second paragraph under "Descriptions of Preferred Embodiments" and in the Tables under "Detailed Description" and in claim 4. It is directed to the contacting of catalysts with a bismuth or manganese compound to negate the effects of metals poisoning.

U.S. Pat. No. 4,036,740 to Readal et al. teaches use of antimony, bismuth, manganese, and their compounds convertible to the oxide form to maintain a volume ratio of carbon dioxide to carbon monoxide in the regeneration zone of a fluid catalytic cracker of at least 2.2.

Cimbalo et al., May 15, 1972, teaches the effects of nickel and vanadium on deleterious coke production and deleterious hydrogen production in an FCC unit using zeolite-containing catalyst.

SUMMARY OF THE INVENTION
I. GENERAL STATEMENT OF THE INVENTION

According to the invention, an improved "magnetic hook"-promoted catalytic process, catalyst and method of manufacture for heavy hydrocarbon conversionl, stock to produce lighter molecular weight fractions, including lower olefins and higher isobutane than normally produced has been discovered. This process is based on the discovery that two elements, namely manganese and chromium, previously employed as magnetic enhancement agents to facilitate removal of old catalyst, or to selectively retain expensive catalysts, can also themselves function as selective cracking catalysts, particularly when operating on feeds containing significant ainotmts of nickel and vanadium, and especially where economics require operating with high nickel- and vanadium-contaminated and containing catalysts. Under such conditions, these promoted catalysts are more hydrogen and coke selective, have greater activity, and maintain that activity and superior selectivity in the presence of large amounts of containment metal, while also making more gasoline at a given conversion.

II. UTILITY OF THE INVENTION

Table A summarizes approximate preferred, more preferred, and most preferred levels of the more important parameters of the invention. Briefly stated, the invention comprises improving gasoline selectivity in a process for the conversion of hydrocarbons, e.g., gas oils, preferably those containing more than 1 ppm of nickel and/or more than 1 ppm of vanadium to lower molecular weights comprising gasoline by contacting said hydrocarbons with a circulating zeolite-containing cracking catalyst, which is thereafter regenerated and recycled to contact additional hydrocarbons, the improvement comprising in combination the steps of: a) maintaining a catalyst:oil weight ratio of at least about 2, more preferably at least 3; and b) adding to at least a portion of said cracking catalyst from about 0.1 to 20 wt. % of manganese and/or chromium, in the form of a compound, based on the weight of the catalyst; whereby gasoline selectivity is increased by at least 0.2 wt. % points as compared to said process without said manganese or chromium. More preferably the portion of cracking catalyst to which manganese is added comprises from 5–100 wt. % of the total weight of the circulating catalyst. This portion can optionally contain more than 0.5% by weight of sodium. This process and catalyst are especially effective when used in conjunction with a circulating catalyst containing nickel and vanadium and/or when operating at higher steam and/or temperature severity.

When cracking reside, the weight of manganese is preferably maintained at about 0.3 or above times the total nickel-plus-vanadium or total metals or total vanadium on the circulating catalyst. The carbon remaining after regeneration is preferably no more than 0.1% of the weight of the carbon deposited on the catalyst during hydrocarbon conversion. Particularly preferred is a process wherein the fresh catalyst is added over time to the circulating catalyst, particularly where the fresh catalyst comprises 0.1–20 wt. % manganese and/or a similar concentration of chromium. The manganese-containing cracking catalyst added can be the same or different from that circulating and can preferably comprise a paraffin-selective cracking catalyst such as Mobile's ZSM-5. One important advantage of the invention is that the cracking catalyst can be rendered more gasoline selective, coke selective, and/or hydrogen selective when it contains 0.1–20 wt. % manganese and/or chromium and is even more selective when the catalyst is contaminated with nickel and/or vanadium, as compared to the selectivity of an equivalent catalyst without manganese. The manganese and/or chromium is preferably deposited onto the outer periphery of each microsphere but can be deposited uniformly throughout the microsphere, where the most preferred microspherical catalysts particles are used. Cracking activity can exist in both the zeolite and the matrix. Manganese preferably can also serve as an oxidation catalyst to accelerate the conversion of carbon to CO and $CO_2$ and any sulfur in the coke to $SO_2$, $SO_3$ or sulfate and can act as a reductant in the conversion reactor to convert greater than 10% of the retained sulfate in the reactor to $SO_2$, sulfur and $H_2S$.

Cracking catalyst can be prepared by incorporating manganese into a microspherical cracking catalyst by mixing with a solution of a manganese salt with a gelled cracking catalyst and spray drying the gel to form a finished catalyst or a solution of manganese salt can be combined with the normal catalyst preparation procedure and the resulting mixture spray-dried, washed and dried for shipment. Manganese can be added to the microspherical catalyst by impregnating the catalyst with a manganese-containing solution and flash drying. Preferred salts of manganese for catalyst preparation include nitrate, sulfate, chloride, and acetate of manganese. The selective cracking catalyst can be prepared by impregnating spray-dried catalyst with MMT (methylcyclopentadienyl manganese tricarbonyl) and drying. The MMT can be dissolved in alcohol or other solvent which can be removed by heating. Alternatively, spray-dried or extruded or other catalyst can be impregnated with a colloidal water suspension of manganese oxide or other insoluble manganese compound and dried. The continuous or periodic addition of a water or organic solution of manganese salts with or without methyl cyclopentadienyl manganese tricarbonyl in a solvent can also be employed with the invention. Manganese compounds, preferably MMT or manganese octoate in mineral spirits or a water solution of a manganese salt, can also be added directly to the catalytic cracker feed and subsequently deposited on the circulating catalyst.

The virgin catalysts will preferably possess a magnetic susceptibility of greater than about $1\times10^{-6}$ emu/g and this can be promoted to a magnetic hook in the range of about $1-40\times10^{-6}$ emu/g or even greater. (Magnetic hooks are discussed in detail in U.S. Pat. Nos. 5,106,486; 5,230,869 and 5,364,827 to Hettinger et al.) The coke produced in the conversion is burned off by contact with oxygen-containing gas in a conventional regenerator and the manganese can serve as an oxidation catalyst in the regenerator to accelerate the conversion of carbon to carbon monoxide and/or carbon dioxide, enhancing the regeneration process.

As an additional advantage of the invention, the sulfur in some gasolines can be reduced by 10% or even more as compared to gasoline produced without manganese in the catalyst.

A portion of the circulating catalyst can be removed from the process of the invention and treated with nitrogen, steam and greater than 1% oxygen (preferably in the form of air) for 10 minutes to 1 hour or even more at 1200° F. or greater, then returned to the process, to effect a partial or complete regeneration of the catalyst.

TABLE A

PROCESS

| Parameters | Units | Preferred | More Preferred | Most Preferred |
|---|---|---|---|---|
| V in Gas Oil Feed | wt. ppm | 0.1 or more | — | — |
| Ni in Gas Oil Feed | Wt. ppm | 0.1 or more | — | — |
| V in Resid Feed | Wt. ppm | 1 or more | 10 or more | 50 or more |
| Ni in Resid Feed | Wt. ppm | 1 or more | 10 or more | 50 or more |
| Ni + V on Catalyst (resid) | Wt. ppm | above Δ 500 | above 1000 | above 5000 |
| V on Catalyst (resid) | Wt. ppm | 100–100,000 | above 500 | above 1000 |
| Mn on Catalyst | Wt. % | 0.05–20 | 0.1–15 | 0.2–10 |
| Catalyst | compos. | Zeo-containing | USY-containing | ZSM-5 containing |
| Cat:Oil ratio | Wt. | 2 or more | 2.5–12 | 3–20 |
| Mn/Cr on Catalyst | Wt. % | 0.1–20 | 0.5–15 | 1–10 |
| Mn/Cr Addition Meth. | | any | exchange or impregnation | impregnation |
| Gasoline Selectivity Δ | Wt. % | +0.2 or more | +0.4 or more | +1 or more |
| "Portion" with Mn/Cr | Wt. % | 5–100 | 10–50 | 15–25 |
| Na in "Portion" | Wt. % | more than 0.5 | more than 0.6 | more than 0.7 |
| Mn:(Ni + V) on Catalyst | Wt. ratio | above 0.3 | above 0.5 | above 1 (resid) |
| Mn:V on Catalyst | Wt. ratio | above 0.3 | above 0.5 | above 1 (resid) |
| Cr:(Ni + V) on Catalyst | Wt. ratio | above 0.3 | above 0.5 | above 1 (resid) |
| Concarbon in feed | Wt. % | above 0.1 | above 0.3 | 1–7 |
| % of Carbon on Cat. remaining after regen. | % of orig. | 0.5 or less | 0.1 or less | 0.05–0.1 |
| Zeolite-in-Catalyst | Wt. % | 1 or more | 5 or more | 10 or more |
| Hydrocarbon Concarb. | Wt. % | above 0.1 | above 0.5 | above 4 |
| S in Hydrocarbon feed | Wt. % | above 0.2 | above 0.5 | above 2 |
| S retention by Mn | Wt. % of S | 10 or more | 12 or more | 15 or more |
| % Sulfate in Reactor Converted | Wt. % of S | above 10 | above 12 | above 15 |
| Catalyst Form | Form | any | microspheres | spray-dried microspheres |
| Cat. Mag. Suscept. | $10^{-6}$ emu/g | above 1 | 2–40 | 3–40 |
| Cat. Mag. Hook Mag. Susceptibility Increase | $10^{-6}$ emu/g | 1–50 | 2–40 | 3–40 |
| Reduction of SOx in Flue | % of S in | 10 or more | 12 or more | 15 or more |

The present invention is useful in the conversion of hydrocarbon feeds, and preferably metal-contaminated residual feeds, to lower molecular, weight products, e.g., transportation fuels.

DESCRIPTION OF THE PREFERRED EMBODIMENTS

The following examples are presented to illustrate preferred embodiments of the invention, but the invention is not to be considered as limited by the specific embodiments presented herein.

EXAMPLE 1

A Process for Converting Residual, Gas Oil, and a Catalyst Composition

A high performance commercial cracking catalyst, especially targeted for heavy hydrocarbons processing, including gas oils and reduced crudes containing high levels of metals such as nickel, vanadium and copper as well as sulfur and nitrogen, is selected for evaluating the effect of manganese n enhancing the activity and selectivity of this high performance catalyst. This catalyst contains 38.8% $SiO_2$ and 49.3% $Al_2O_3$, 1.06% $T_1O_2$ and 0.69% $Fe_2O_3$. Of special significance, this catalyst also contains 4300 ppm cerium, 6400 ppm lanthanum, 340 ppm gadolinium, 1400 ppm praseodymium, and 4100 ppm neodymium for a total of 16,540 ppm of rare earth, or 1.65 wt. % rare earth, or approximately 2 wt. % rare earth oxide. This is considered a high-loaded rare earth catalyst.

Five batches of catalyst are prepared, in which each batch consists of four catalysts containing zero, and increasing levels of manganese. All catalysts are prepared in a manner considered suitable for commercial utilization, although many different options could also be utilized. Following is an example of the procedure used for impregnating four of the batches.

The commercial catalyst described is dried at 250° F. for 24 hours. 35 gms of catalyst is dispersed in 75 ml of distilled water at 95° C. and is impregnated with 1.56 gms of manganese acetate tetrahydrate in 25 ml of water and allowed to stand at this temperature overnight to reach equilibrium between catalyst and solution. The catalyst is then filtered to remove all liquid, dried at 250° F. and calcined at 1200° F. for four or more hours. In batch number 5, manganese acetate tetrahydrate was dissolved in a small amount of water so as to fill all the catalyst pores, leaving little excess liquid. In this case, it was dried without filtration and then calcined. Other batches are variations of the general method of preparation similar to this example.

Figure 21:
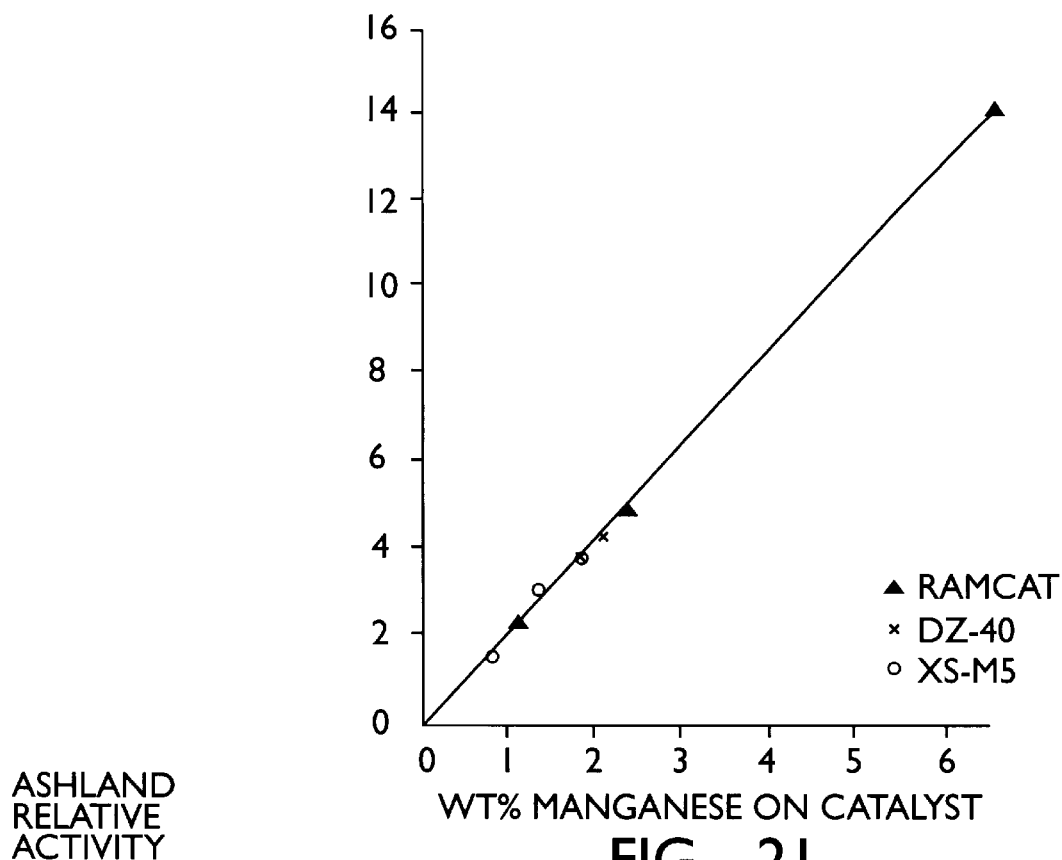
FIG. 21 is a plot of the relationship between magnetic properties and manganese on catalyst. (Examples 1 and 16, and Tables 1 and 13.)

The following table shows the manganese composition of these five batches of catalyst consisting of a total of 20 catalysts. Manganese was determined by either XRF (xray fluorescence) or magnetic susceptibility or both. FIG. 21.

TABLE I

| | | Manganese Content (wt. %) | | | |
|---|---|---|---|---|---|
| Batch No. | Sample No. | 1 | 2 | 3 | 4 |
| I | | 0.0 | 0.65 | 1.48 | 2.25 |
| II | | 0.0 | 0.52 | 0.84 | 1.07 (1.03) |
| III | | 0.0 | 0.34 | 1.31 | 2.20 (2.34) |
| IV | | 0.0 | 0.42 | 0.90 | 1.10 |
| V | | 0.0 | 1.00 | 4.20 | 6.70 (6.70) |

Samples $I_1$, $II_2$, $II_4$, $III_4$, $IV_3$, and $V_4$ are submitted for MAT testing by USX Engineers and consultants, Inc., UEC Fuels and Lubrication Laboratories, 4000 Tech Center Drive, Monroeville, Pa.

The results of these tests are shown in Table II.

TABLE 2

| | Catalyst No. | | | | | |
|---|---|---|---|---|---|---|
| | 1 | 2 | 3 | 4 | 5 | 6 |
| Catalyst | $I_1$ | $II_2$ | $II_4$ | $III_4$ | $IV_3$ | $V_4$ |
| Manganese (%) | 0.0 | 0.52 | 1.03 | 2.34 | 0.90 | 6.7 |
| MAT (wt. %) | 71.0 | 81.2 | 75.0 | 61.8 | 77.8 | 49.1 |
| Gasoline (wt. %) | 49.8 | 55.3 | 54.6 | 45.9 | 56.8 | 38.2 |
| Selectivity (wt. %) | 70.1 | 68.0 | 72.0 | 74.3 | 73.0 | 77.8 |
| Selectivity (wt. %) 75% Conversion | 69 | 72 | 72 | 73 | 74 | 74 |
| Ashland's Relative Activity | 50 | 250 | 140 | 100 | 25 | 5 |

Figure 22:
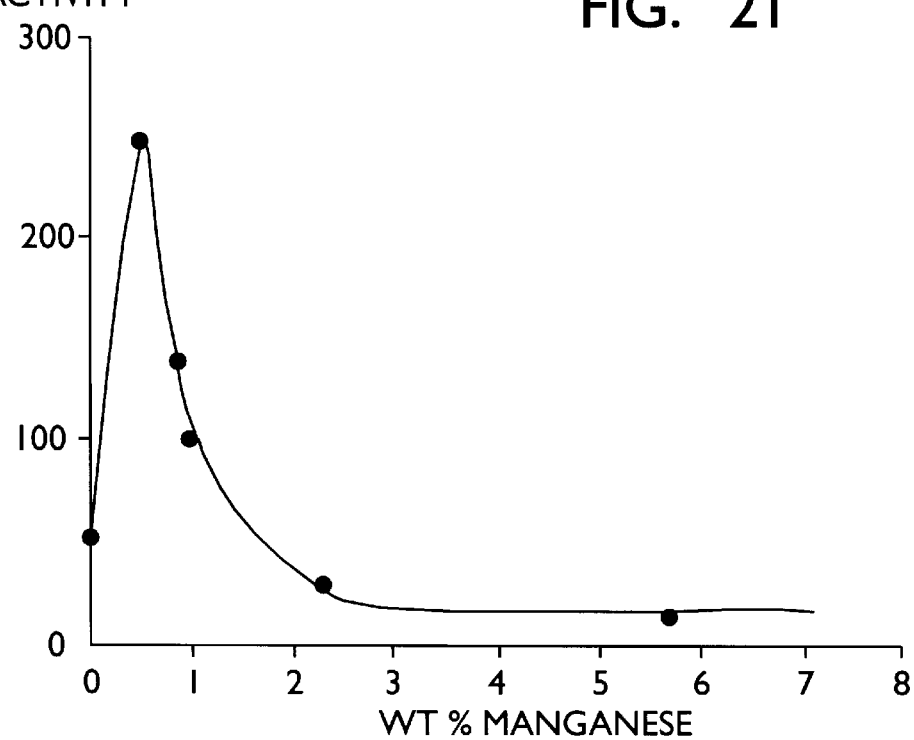
FIG. 22 is a plot of relative activity versus weight percent manganese. (See Example 1 and Table 1.)

FIG. 22 shows a plot of Ashland's relative activity versus wt. % manganese, as can be seen, even with a rare earth content of 16,530 ppm rare earth, activity jumped significantly even at 0.5 wt. % Mn.

Figure 23:
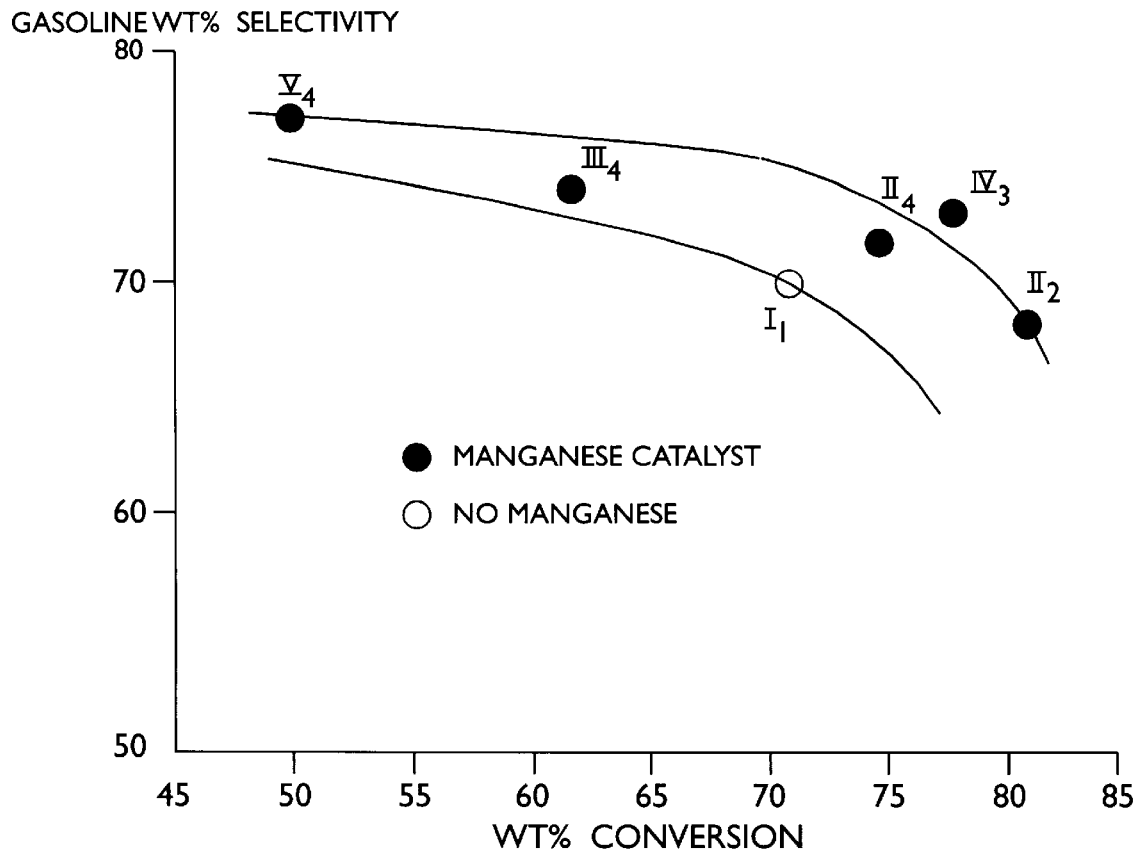
FIG. 23 is a plot of gasoline selectivity versus weight percent conversion using catalyst containing manganese and catalyst with no manganese addition. (see Example 1 and Table 1.)

FIG. 23 is a plot of gasoline selectivity versus wt. % conversion.

Figure 24:
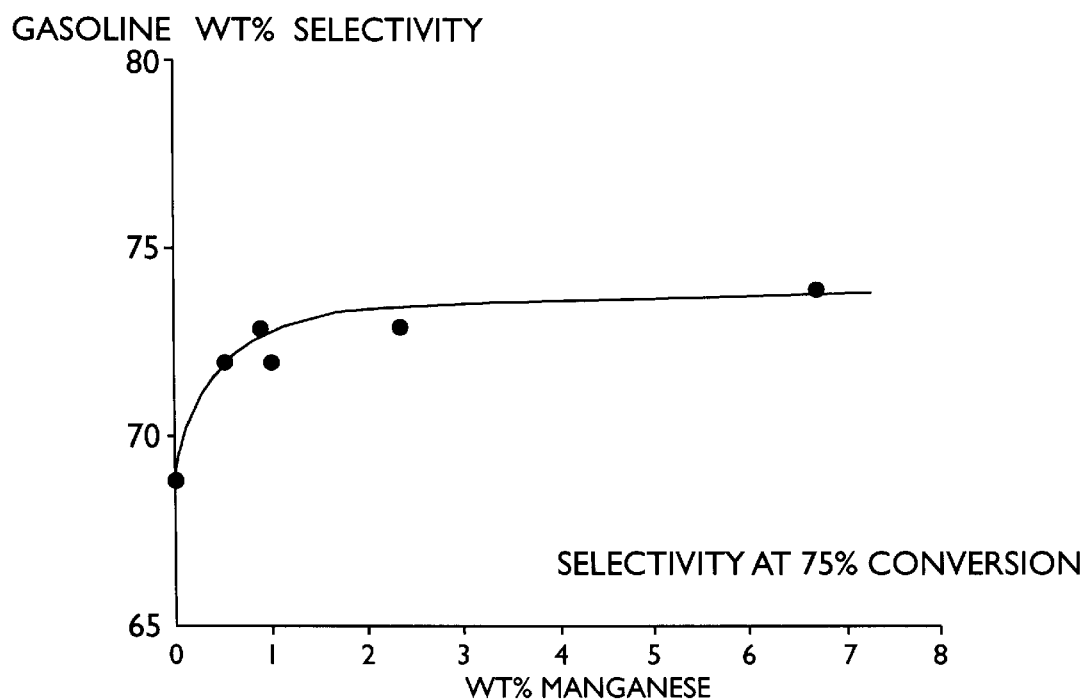
FIG. 24 is a plot of gasoline selectivity versus weight percent manganese on catalyst at 75% conversion. (See Example 1 and Table 1.)

FIG. 24 is a plot of catalyst wt. % selectivity versus wt. % manganese calculated at 75 wt. % conversion, as determined by analysis of FIG. 23.

As can be seen activity increases rapidly as manganese increases in concentration and then drops a concentration increases further, but even as high levels of manganese, selectivity remains very high above the untreated catalyst.

With such a high level of rare earth (promotor) content and manganese combined, it is not unanticipated that activity should fall, but it is surprising that selectivity, that key economic measure, remains in a strikingly high level.

EXAMPLE 2

Further Effects of Manganese at Similar Levels

Two catalyst preparations, using similar procedure as used for the catalysts in Example 1, are made, but at slightly different levels of manganese. These two samples are labeled AKC #1 and AKC #2. AKC #1 is shown by x-ray fluorescence to have 9200 ppm of manganese and AKC #2 contained 15,000 ppm of manganese.

AKC #1 and AKC #2 are also submitted for MAT testing, and the results (see Table 3a) further confirm the activity and selectivity results noted in Table 2, Example 1.

TABLE 3a

Manganese Addition

| Catalyst Metal | Base Catalyst None | AKC #1 | AKC #2 |
| --- | --- | --- | --- |
| Metal Manganese ppm | none | 9280 | 15900 |
| Steaming Temperature (° F.) | 1425 | 1425 | 1425 |
| Steaming Time (hours) | 24 | 24 | 24 |
| Feed Stock | RPS | RPS | RPS |
| Cat:Oil Ratio | 4.6 | 4.48 | 4.51 |
| Reaction Temperature (° F.) | 960 | 960 | 960 |
| Reaction Time (seconds) | 25 | 25 | 25 |
| WHSV | 31.3 | 32.1 | 31.9 |
| Conversion (wt. %) | 67.37 | 74.56 | 74.21 |
| Conversion (vol. %) | 69.06 | 76.49 | 76.15 |
| Product Yields (wt. %) on Fresh Feed | | | |
| $C_2$ and Lighter | 1.41 | 1.46 | 1.32 |
| Hydrogen | 0.11 | 0.09 | 0.08 |
| Methane | 0.45 | 0.44 | 0.41 |
| Ethane | 0.37 | 0.39 | 0.36 |
| Ethylene | 0.48 | 0.52 | 0.47 |
| Carbon | 3.64 | 4.46 | 4.73 |
| Total $C_3$ Hydrocarbon | 5.36 | 5.25 | 4.73 |
| Propane | 0.62 | 0.75 | 0.72 |
| Propylene | 4.75 | 4.5 | 4.01 |
| Total $C_4$ Hydrocarbon | 10.54 | 10.79 | 9.98 |
| I-Butane | 3.55 | 4.46 | 4.35 |
| N-Butane | 0.54 | 0.76 | 0.75 |
| Total Butenes | 6.45 | 5.57 | 4.88 |
| Butenes | 3.18 | 2.41 | 2.03 |
| T-Butene-2 | 1.86 | 1.8 | 1.63 |
| C-Butene-2 | 1.4 | 1.36 | 1.22 |
| $C_5$-430° F. Gasoline (Vol. %) | 46.42 | 52.60 | 53.46 |
| | (56.24) | (63.72) | (64.76) |
| 430–650° F. LCGO | 22.35 | 18.53 | 18.72 |
| 650° F. + Decanted Oil | 10.28 | 6.91 | 7.07 |
| $C_3$ + Liquid Recovery | 94.95 | 94.08 | 93.95 |
| FCC Gasoline + Alkylate Vol. % | 87.4 | 91.8 | 89.6 |
| Isobutane/($C_3$ + $C_4$) Olefin Ratio | 0.32 | 0.45 | 0.49 |
| Coke Selectivity | 1.64 | 1.44 | 1.55 |
| Weight Balance | 99.7 | 98.63 | 98.13 |
| Option | | Normalized | Normalized |
| Wt. % Selectivity for $\frac{\text{Wt. \% Gaso.}}{\text{Wt. \% Conv.}} \times 100\%$ | 68.9 | 70.5 | 72.0 |
| Vol. % Selectivity = $\frac{\text{Vol. \% Gaso.}}{\text{Vol. \% Conv.}} \times 100\%$ | 81.4 | 83.3 | 85.0 |
| K = Activity = $\frac{\text{Wt. \% Conv.}}{100 - \text{Wt. \% Conv.}}$ | 2.06 | 2.93 | 2.90 |

As can be seen by this data, manganese again greatly increases activity and selectivity, while making much less coke (on a selectivity basis) and hydrogen. Clearly manganese has a markedly beneficial effect on catalyst performance.

EXAMPLE 3

Manganese on Higher Levels of Cat:Oil Ratio

Referring to Table 3b, steamed samples of AKC #1 are MAT evaluated at a series of cat:oil ratios, to better define activity and selectivity. Table 3b shows the results of this study, and Table 3c shows the composition of the gas oil used in these tests.

TABLE 3b

Effect of Manganese on Cracking Yields MAT Data on AKC #1 Steamed Samples Variation Cat:Oil Ratio

| Catalyst ID | AKC #1 | AKC #1 + Mn | AKC #1 | AKC #1 + Mn | AKC #1 | AKC #1 + Mn |
|---|---|---|---|---|---|---|
| Steaming Temp (° F.) | 1400 | 1400 | 1400 | 1400 | 1400 | 1400 |
| Steaming Time (hours) | 5 | 5 | 5 | 5 | 5 | 5 |
| Cat:Oil Ratio | 2.9 | 3.1 | 4.0 | 4.0 | 4.8 | 5.1 |
| Temperature (° F.) | 915 | 915 | 915 | 915 | 915 | 915 |
| Catalyst Metals Manganese (ppm) | 0 | 9200 | 0 | 9200 | 0 | 9200 |
| Feed Stock | WTGO | WTGO | WTGO | WTGO | WTGO | WTGO |
| Wt. % Yields | | | | | | |
| Conversion | 64.9 | 73.2 | 74.9 | 78.8 | 78.4 | 81.3 |
| Hydrogen | 0.05 | 0.05 | 0.07 | 0.07 | 0.08 | 0.08 |
| Methane | 0.30 | 0.34 | 0.38 | 0.44 | 0.45 | 0.52 |
| Ethane/Ethylene | 0.58 | 0.70 | 0.73 | 0.90 | 0.84 | 1.02 |
| Propane | 0.58 | 0.93 | 0.78 | 1.30 | 0.97 | 1.65 |
| Propylene | 3.53 | 3.55 | 4.43 | 3.98 | 4.70 | 4.08 |
| Isobulane | 3.63 | 5.08 | 4.63 | 6.06 | 5.71 | 6.82 |
| 1-Butene/Isobutene | 2.26 | 1.76 | 2.48 | 1.52 | 1.46 | 1.58 |
| N-Butane | 0.59 | 1.06 | 0.79 | 1.37 | 1.02 | 1.65 |
| Butadiene | 0.00 | 0.00 | 0.00 | 0.00 | 0.00 | 0.00 |
| Cis-2-Butene | 0.99 | 1.02 | 1.21 | 0.99 | 1.23 | 0.98 |
| Trans-2-Butene | 1.36 | 1.36 | 1.64 | 1.32 | 1.67 | 1.31 |
| $CO$, $CO_2$, $CO_S$, $H_2S$ | 0.33 | 0.35 | 0.35 | 0.33 | 0.32 | 0.37 |
| $C_5$-430° F. | 48.42 | 53.77 | 54.28 | 56.05 | 55.90 | 55.96 |
| 400–630° F. | 17.46 | 16.39 | 15.82 | 14.27 | 14.25 | 12.96 |
| 630° F.+ | 17.63 | 10.41 | 9.28 | 6.97 | 7.38 | 5.82 |
| Coke | 2.28 | 3.23 | 3.15 | 4.42 | 4.02 | 5.30 |
| $H_2$, SCFB | 27 | 29 | 38 | 39 | 46 | 47 |
| H2:Cl Ratio, Mol:Mol | 1.25 | 1.15 | 1.39 | 1.21 | 1.40 | 1.22 |
| Dry Gas | 1.25 | 1.43 | 1.52 | 1.74 | 1.70 | 1.99 |
| Wet Gas | 12.94 | 14.77 | 15.96 | 16.55 | 16.75 | 18.07 |
| Selectivity = $\frac{\text{Wt. \% Gaso.}}{\text{Wt. \% Conv.}} \times 100\%$ | 74.6 | 73.5 | 72.5 | 71.1 | 71.3 | 68.8 |
| K = Rate Constant | 1.85 | 2.74 | 2.98 | 3.72 | 3.63 | 4.35 |
| Coke Selectivity % Coke/K | 1.23 | 1.18 | 1.06 | 1.19 | 1.11 | 1.22 |
| H2 Selectivity | 0.0270 | 0.0183 | 0.0235 | 0.0188 | 0.0220 | 0.0184 |
| AOI Relative Activity | 35 | 100 | 90 | 162 | 118 | 168 |

TABLE 3C

West Texas Gas Oil

| | | Metals |
|---|---|---|
| Wt. % Sulfur 0.49 | API 28.1 | Ni < 1 ppm |
| Total Nitrogen 330 ppm | Ramsbottom Carbon 0.19% | V < 1 ppm |
| Basic Nitrogen 213 ppm | | Na 5 ppm |
| | | Fe 1 pm |

Chemical Composition

| | Wt. % |
|---|---|
| Saturates | 67.1 |
| Monoromatics | 19.5 |
| Diaromatics | 5.6 |
| Greater than Diaromatics | 5.6 |
| Polars | 2.0 |

Figure 1:
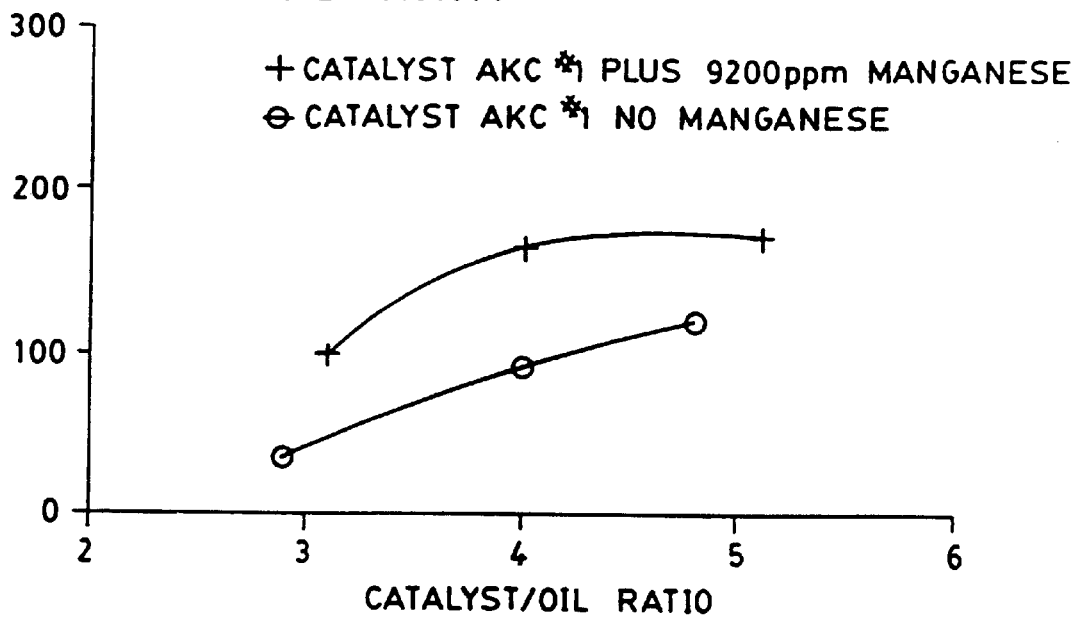
FIG. 1 is a plot of relative activity (by Ashland Inc. test, see e.g., U.S. Pat. No. 4,425,259 to Hettinger et al.) versus cat:oil weight ratio for AKC #1 catalyst (the same catalyst except for FIG. 7 and including catalyst AKC #2 in FIGS. 19 and 20, used in FIGS. 1–18) catalyst with and without manganese. (See Example 3 and Table 3b.)
Figure 6:
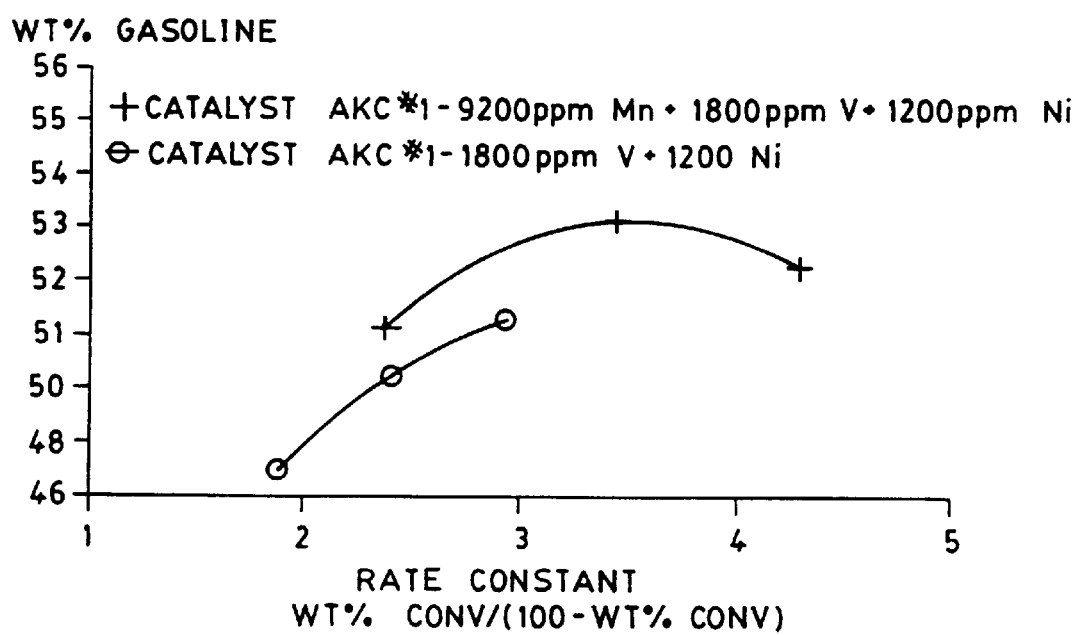
FIG. 6 is a plot of wt. % gasoline in product versus conversion rate constant for the catalysts with and without manganese showing the improved gasoline percentage with manganese. (See Example 4 and Table 4.)

The results show that manganese greatly increases catalyst activity at all cat:oil ratios, namely a 48% increase at a cat:oil ratio of 3.0; a 25% increase at a cat:oil of 4.0; and a 20% increase at cat:oil of 5.0, using the wt. % conversion rate constant, K, for these comparisons. On an Ashland relative activity basis (see for example U.S. Pat. No. 4,425,259, FIG. 6) it is 186%, 80%, and 42%, respectively. In all cases of cat:oil it is obvious that there is a significant increase in catalyst activity resulting from manganese additive (see FIG. 1).

Figure 2:
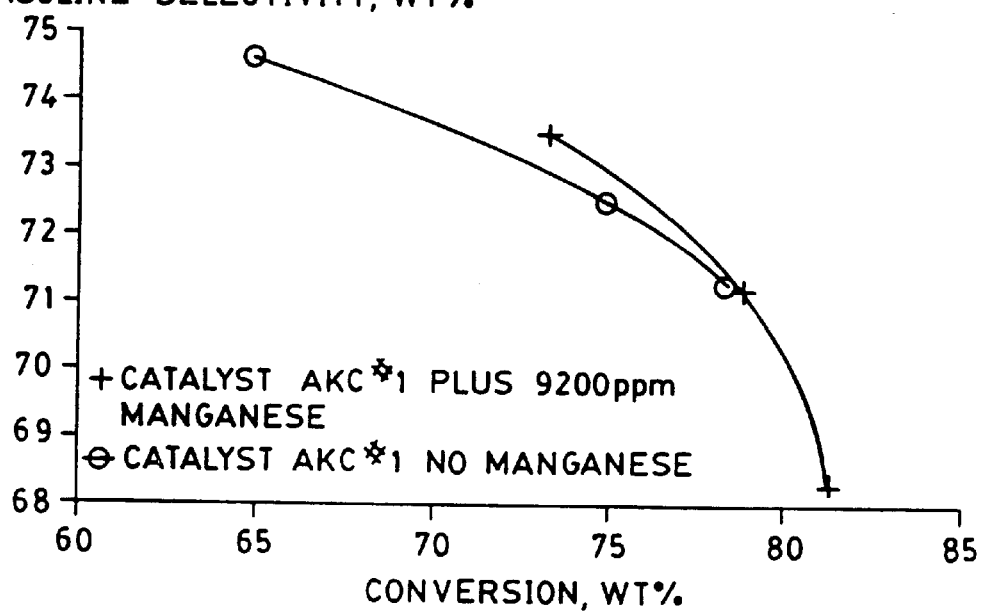
FIG. 2 is a plot of wt. % gasoline selectivity versus wt. % conversion in a typical cracking process and compares catalysts with and without manganese. (See Example 3 and Table 3b.)
Figure 3:
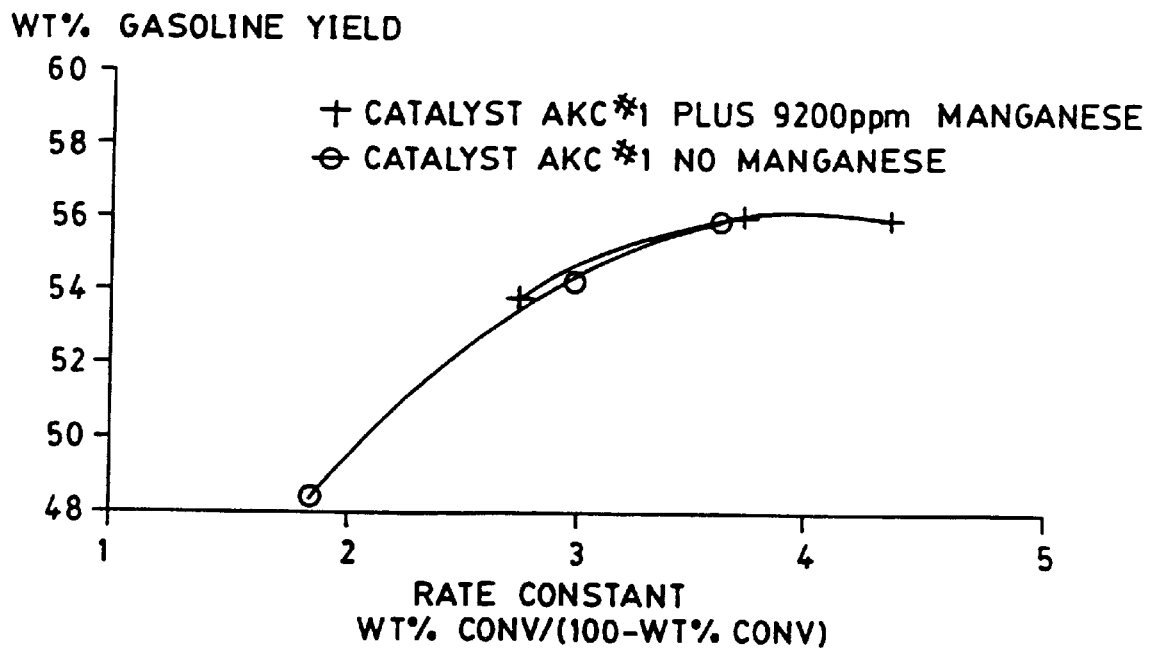
FIG. 3 is a plot of gasoline yield versus conversion rate constant and compares catalysts with and without manganese. (See Example 3 and Table 3b.)

At first glance, it would appear that in this series of tests, manganese is not superior, selectivity wise, to untreated catalyst. However, this is partially due to the considerable differences in conversions at constant cat:oil testing. FIG. 2 is a plot of wt. % gasoline selectivity versus wt % conversion. Here it is quite clear that selectivity is also enhanced. For example, at 75 wt % conversion there is clearly an increase of selectivity from 72.4 wt % to 72.9 wt %. For a catalytic cracker operating at 75 wt % conversion and processing 50,000 bbl/day of gas oil, this selectivity difference amounts to an increased yield of gasoline of approximately 250 barrels/day. At $30/bbl this is equivalent to an additional yield of $7500/day or $2.8 mm/year, a very significant amount. FIG. 3 shows a plot of gasoline yield as related to activity as rate constant which is expressed as wt % conversion divided by (100%-wt % conversion). This plot also shows the advantage of manganese promotion.

Note that in all cases, even where metal contaminants are absent, hydrogen selectivity is enhanced in the presence of manganese and the olefin content of wet gas is lower, the result of the ability of manganese to transfer hydrogen to olefins, an important property in reducing olefin content of gasoline, so important in reformulated gasoline. Note also that isobutane content at constant conversion is up, providing the refiner with greater alkylate capacity, an equally important property in tomorrow's refinery.

EXAMPLE 4

Metals on Manganese Promoted Cracking Catalyst

Although the results of Examples 1, 2, and 3 conclusively show the benefits of manganese as an additive on catalyst performance, in today's environment, because of the unavailability of low metals containing crude oil and/or the economic necessity to process a greater portion or all of the reduced crude, a catalyst's resistance to metals poisoning, and also its ability to deal with crudes of higher sulfur content are also of great concern. In particular, its abilities to deal with vanadium, a well known hydrogen and coke producer, and a notorious destroyer of catalyst activity, and nickel, a hydrogen and coke producer are of special interest.

To evaluate the benefit of manganese as a metal resistant additive, an aliquot of catalyst is stained according to standard conditions as described in Example #3, while a second aliquot is impregnated to 3000 ppm of Nickel+Vanadium (1800 ppm vanadium and 1200 ppm nickel) and steam deactivated at 1400° F. for 5 hours in 3% air, a condition shown to be quite severe, especially for vanadium poisoned cracking catalyst. Table 4 shows the results of these tests at three different cat:oil ratios, similar to Example 3.

TABLE 4

Effect of Manganese on Cracking Yields MAT Data on AKC #1 3000 ppm Ni + V Samples

| Catalyst ID | AKC #1 | AKC #1 + Mn | AKC #1 | AKC #1 + Mn | AKC #1 | AKC #1 + Mn |
|---|---|---|---|---|---|---|
| Steaming Temp (° F.) | 1400 | 1400 | 1400 | 1400 | 1400 | 1400 |
| Steaming Time (hours) | 5 | 5 | 5 | 5 | 5 | 5 |
| Cat:Oil Ratio | 3 | 3.1 | 4.0 | 4.1 | 4.9 | 5.0 |
| Temperature (° F.) | 915 | 915 | 915 | 915 | 915 | 915 |
| Catalyst Metals Total (1800 ppm V, 1200 ppm Ni) | 3000 | 3000 | 3000 | 3000 | 3000 | 3000 |
| Manganese ppm | 0 | 9200 | 0 | 9200 | 0 | 9200 |
| Wt. % Yields | | | | | | |
| Conversion | 65.4 | 70.4 | 70.7 | 77.5 | 74.5 | 81.1 |
| Hydrogen | 0.33 | 0.38 | 0.43 | 0.49 | 0.51 | 0.61 |
| Methane | 0.37 | 0.41 | 0.48 | 0.57 | 0.59 | 0.73 |
| Ethane/Ethylene | 0.64 | 0.73 | 0.74 | 0.92 | 0.83 | 1.08 |
| Propane | 0.62 | 0.99 | 0.79 | 1.36 | 0.93 | 1.76 |
| Propylene | 3.41 | 3.20 | 3.86 | 3.62 | 4.08 | 3.77 |
| Isobutane | 3.04 | 4.25 | 3.77 | 5.51 | 4.33 | 6.37 |
| 1-Butene/Isobutene | 2.26 | 1.46 | 2.42 | 1.51 | 2.35 | 1.45 |
| N-Butane | 0.56 | 0.92 | 0.70 | 1.27 | 0.83 | 1.61 |
| Butadiene | 0 | 0 | 0 | 0 | 0 | 0 |
| Cis-2-Butene | 0.96 | 0.81 | 1.07 | 0.89 | 1.12 | 0.89 |
| Trans-2-Butene | 1.30 | 1.08 | 1.43 | 1.21 | 1.50 | 1.22 |
| CO, $CO_2$, $CO_8$, $H_2S$ | 0.38 | 0.35 | 0.39 | 0.37 | 0.47 | 0.40 |
| $C_5$–430° F. | 48.51 | 51.15 | 50.27 | 53.15 | 51.27 | 52.30 |
| 430–630° F. | 18.13 | 17.09 | 17.27 | 14.74 | 15.48 | 12.52 |
| 630° F.+ | 16.45 | 12.54 | 11.98 | 7.76 | 9.97 | 6.35 |
| Coke | 3.05 | 4.62 | 4.41 | 6.62 | 5.74 | 8.94 |
| $H_2$, SCFB | 191 | 223 | 253 | 286 | 295 | 358 |
| H2:C1 Ratio, Mol:Mol | 6.93 | 7.31 | 7.22 | 6.78 | 6.76 | 6.67 |

TABLE 4-continued

Effect of Manganese on Cracking Yields MAT Data on AKC #1 3000 ppm Ni + V Samples

| Catalyst ID | AKC #1 | AKC #1 + Mn | AKC #1 | AKC #1 + Mn | AKC #1 | AKC #1 + Mn |
|---|---|---|---|---|---|---|
| Dry Gas | 1.72 | 1.88 | 2.04 | 2.35 | 2.40 | 2.82 |
| Wet Gas | 12.14 | 12.71 | 14.02 | 15.37 | 15.14 | 17.07 |
| AOI Rel Activity | 38 | 74 | 57 | 141 | 81 | 183 |
| K = Rate Constant | 1.89 | 2.38 | 2.41 | 3.44 | 2.92 | 4.29 |
| Selectivity Wt. % | 74.2 | 72.7 | 71.1 | 68.5 | 68.8 | 64.5 |
| Coke Selectivity % Coke/K | 1.61 | 1.94 | 1.82 | 1.92 | 1.96 | 2.08 |
| H2 Selectivity | 0.17 | 0.16 | 0.18 | 0.14 | 0.17 | 0.14 |

Figure 4:
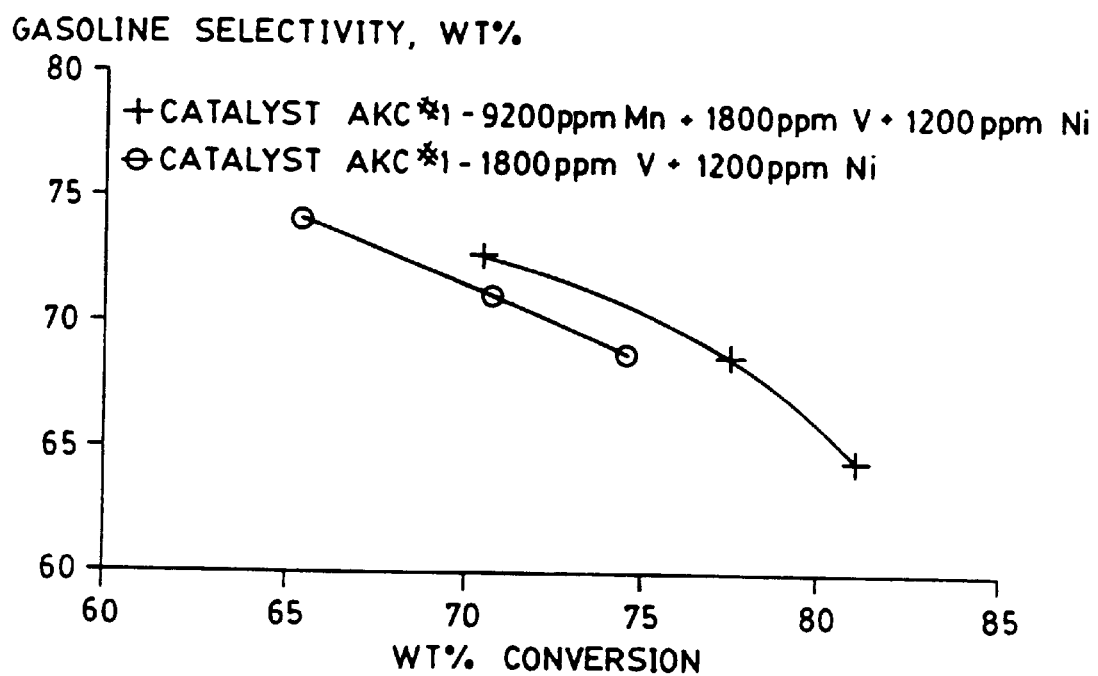
FIG. 4 is a plot of gasoline wt. % selectivity versus conversion comparing catalysts with and without manganese and contaminated with 3000 ppm nickel plus vanadium. (See Example 4 and Table 4.)

Here the effect of manganese promotion is even more dramatic. FIG. 4 shows selectivity is affected much less in the presence of large amounts of vanadium and nickel when the catalyst is protected with manganese.

For example at 75% conversion FIG. 4 shows that the wt % selectivity of a metal poisoned catalyst drops from 72.4 wt % as shown in Example 3, to 68.0 wt % while the catalyst protected and enhanced by manganese only drops to 70.8 wt %. The gasoline yield difference at constant conversion is 2.8 wt % or 1400 barrels/day or $42,000/day or $15.3 mm/yr increase in income, even without taking into account the much higher catalyst activity, which could reduce fresh catalyst addition rates and reduce overall catalyst costs.

Clearly manganese has further enhanced activity and selectivity differences, as the catalyst is subjected to metal poisoning by two severe catalyst poisons, namely nickel and vanadium. This benefit of manganese is also reported here for the first time.

Figure 5:
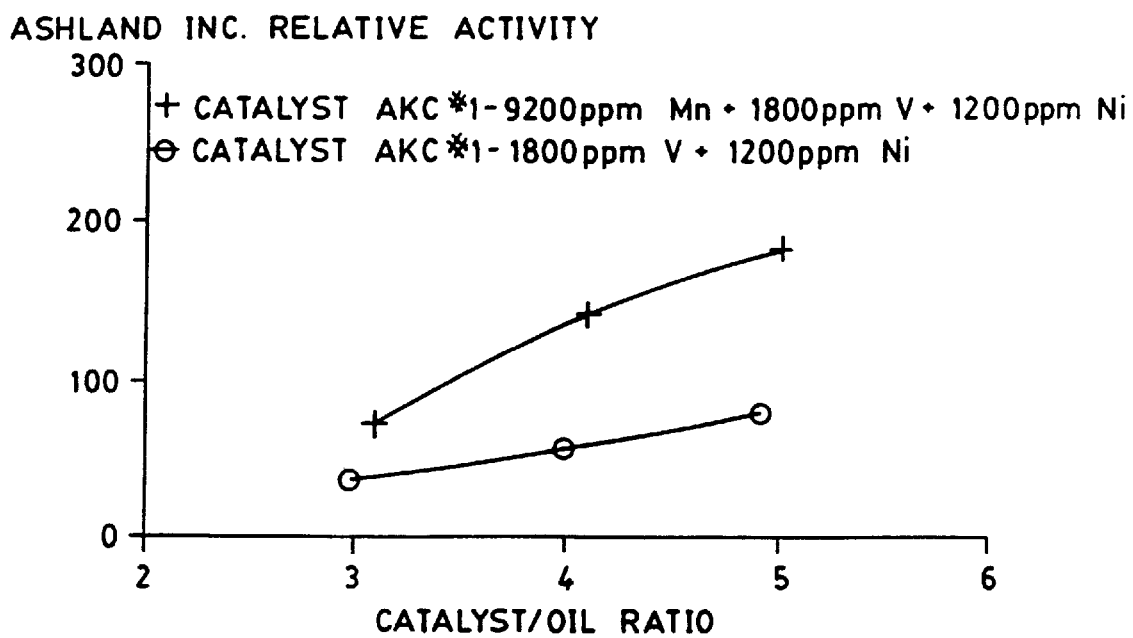
FIG. 5 is a plot of relative activity versus cat:oil ratio comparing catalysts with and without manganese. (See Example 4 and Table 4.)

As noted, this selectivity advantage for manganese is shown at constant conversion. However, FIG. 5 also shows the very significant activity advantage observed for the manganese promoted metal poisoned catalyst, which is equally striking, and the outstanding increase in gasoline yield shown in FIG. 6.

EXAMPLE 5

Impregnation of a Highly Active Reduced Crude Conversion (RCC®) Type Catalyst at Varying Levels of Manganese Concentration Table 5a shows the results of manganese on catalyst activity and selectivity as manganese concentrations are increased up to as high as 2% (19,800) ppm manganese. At constant cat:oil ratio, activity rises some 20–50% and selectivity one-half to twelve and one-half percent as metal increases. (it is well established that selectivity always decreases as conversion increases.) The results clearly show an advantage for manganese as concentrations increase, and while not considered limiting may even indicate an optimum concentration exists. The results also show both the coke and hydrogen factors were significantly improved at all levels of manganese concentrations shown here. Although manganese has been added at levels approaching 2.0% (19,800) ppm, these results confirm that at all levels and tip to and including data in Table 5a, manganese enhances performance, as well as providing protection against contaminating metals.

TABLE 5a

MAT Test Summary
Mn-Impregnated Samples

| | Test No. | | | | |
|---|---|---|---|---|---|
| Catalyst ID | D-2836 DZ-40 | D-2835 DZ-40 | C-5121 DZ-40 | C-5123 DZ-40 | E-2853 DZ-40 |
| Mn Level (ppm) | Base | 2400 | 7.700 | 7.700 | 19.800 |
| Recovery (wt. %) | 97.0 | 97.4 | 98.0 | 97.9 | 97.5 |
| MAT Conversion (vol. %) | 76.9 | 82.0 | 85.5 | 81.2 | 81.9 |
| Normalized Yields (wt. %) | | | | | |
| Acid Gas ($H_2S$,CO,$CO_2$) | 0.49 | 0.51 | 0.46 | 0.37 | 0.47 |
| Dry Gas | 2.26 | 2.40 | 2.27 | 1.78 | 2.42 |
| Hydrogen | 0.18 | 0.15 | 0.11 | 0.08 | 0.17 |
| Methane | 0.63 | 0.67 | 0.65 | 0.51 | 0.71 |
| Ethane + Ethylene | 1.46 | 1.58 | 1.51 | 1.18 | 1.54 |
| Wet Gas | 18.23 | 19.56 | 18.61 | 15.09 | 18.92 |
| Propane | 2.95 | 3.19 | 2.68 | 2.18 | 2.86 |
| Propylene | 3.33 | 3.58 | 3.58 | 2.86 | 3.56 |
| Isobutane | 7.08 | 7.72 | 7.40 | 6.09 | 7.32 |
| 1-Butene + Isobutylene | 1.27 | 1.29 | 1.21 | 0.94 | 1.33 |
| N-Butane | 2.05 | 2.18 | 2.07 | 1.72 | 2.12 |
| Cis-2-Butane | 0.65 | 0.68 | 0.71 | 0.56 | 0.74 |
| Trans-2-Butene | 0.89 | 0.92 | 0.95 | 0.75 | 0.99 |
| Gasoline ($C_5$–430°) | 45.46 | 48.58 | 52.50 | 53.44 | 48.86 |
| Cycle Oil (430–630°) | 14.02 | 13.20 | 12.68 | 14.60 | 12.88 |
| Slurry (630°+) | 11.89 | 7.98 | 6.34 | 7.81 | 7.90 |
| Coke | 7.66 | 7.78 | 7.15 | 6.91 | 8.54 |
| Conversion (wt. %) | 74.09 | 78.82 | 80.98 | 77.59 | 79.21 |
| Gasoline Selectivity (W\t. %) | 61.3 | 61.6 | 64.8 | 68.9 | 61.7 |
| Activity = K | 2.86 | 3.72 | 4.26 | 3.46 | 3.81 |
| $H_2$ Selectivity (% $H_2$/K) | 0.063 | 0.043 | 0.026 | 0.023 | 0.045 |
| Coke Selectivity (% coke/K) | 2.68 | 2.09 | 1.68 | 2.00 | 2.24 |

Note also that all of the manganese promoted catalysts were much more effective in converting slurry oil to lower molecular weight gasoline and light cycle oil. Table 5b shows that this catalyst contains over 1 wt. % (10,000) ppm rare earth before promotion with manganese, and yet manganese is able to greatly enhance activity and selectivity over and above a high level of rare earth promotion.

TABLE 5b

| | (Wt. %) |
|---|---|
| Manganese Catalyst Composition | |
| $Al_2O_3$ | 33.0 |
| $SiO_2$ | 51.2 |
| $TiO_2$ | 1.14 |
| $Fe_2O_3$ | 0.50 |
| MnO | 1.98 |
| Rare Earths ppm Metal | |
| Neodymium | 2800 |
| Praseodymium | 830 |
| Cerium | 1400 |
| Lanthanum | 5900 |
| Total | 10930 |

EXAMPLE 6

Impregnation of a Special Paraffin Cracking Catalyst with Manganese at Varying Levels of Manganese from 0.6% to 1.8%

In this series of experiments, a specialty catalyst designed to selectivity crack n-paraffins is impregnated with manganese at various concentrations in a manner identical with preparations for regular cracking catalysts (Table 6). This catalyst contained approximately 8.5 wt % ZSM5 in a binder matrix. Naturally, because this catalyst is designed only to crack n-paraffins, or slightly branched paraffins, conversion is not nearly as high, nor is selectivity expected to be competitive with normal cracking catalysts.

TABLE 6

MAT Test Summary
Mn-Impregnated Samples

| Test No. | E-2824 | B-5095 | C-5120 | B-5096 |
|---|---|---|---|---|
| Catalyst ID | ZSM-5 | ZSM-5 | ZSM-5 | ZSM-5 |
| Manganese (ppm) | Base | 6200 | 13300 | 17700 |
| Recovery (wt. %) | 101.6 | 101.3 | 101.3 | 101.9 |
| Normalized Yields (wt. %) | | | | |
| Acid Gas ($H_2S$, CO, $CO_2$) | 0.06 | 0.16 | 0.22 | 0.09 |
| Dry Gas | 1.10 | 2.09 | 2.03 | 2.08 |
| Hydrogen | 0.02 | 0.03 | 0.03 | 0.03 |
| Methane | 0.10 | 0.15 | 0.14 | 0.13 |
| Ethane + Ethylene | 0.99 | 1.90 | 1.85 | 1.92 |
| Wet Gas | 10.15 | 10.99 | 10.53 | 11.11 |
| Propane | 0.79 | 2.37 | 2.29 | 2.25 |
| Propylene | 4.53 | 3.39 | 3.30 | 3.67 |
| Isobutane | 0.33 | 1.61 | 1.46 | 1.47 |
| 1-Butene + Isobutylene | 2.43 | 1.41 | 1.36 | 1.56 |
| N-Butane | 0.49 | 1.16 | 1.15 | 1.10 |
| Cis-2-Butane | 0.67 | 0.45 | 0.42 | 0.45 |
| Trans-2-Butene | 0.91 | 0.60 | 0.56 | 0.61 |
| Gasoline ($C_5$-430°) | 6.24 | 10.64 | 9.65 | 8.99 |
| Cycle Oil (430–630°) | 8.59 | 8.99 | 8.47 | 8.59 |
| Slurry (630°+) | 73.37 | 66.69 | 68.51 | 68.67 |
| Coke | 0.48 | 0.45 | 0.59 | 0.46 |
| Conversion (wt. %) | 18.04 | 24.32 | 23.02 | 22.74 |
| Coke Selectivity | 2.18 | 1.41 | 1.97 | 1.59 |
| Selectivity $\frac{\text{Wt. \% Gasoline}}{\text{Wt. \% Conversion}} \times 100$ | 34.6 | 43.8 | 41.9 | 39.5 |
| $\frac{\text{Wt. \% Conv.}}{100 - \text{Wt. \% Conversion}} \cdot \text{Activity} = K$ | 0.22 | 0.32 | 0.30 | 0.29 |

Even here manganese is shown to greatly increase cracking activity 30–50% and also selectivity 14–26%. Note again that coke selectivity is greatly improved. Surprisingly, the yield of isobutane is greatly increased almost five-fold, and both propane and n-butane jumped dramatically, showing the ability of manganese to transfer hydrogen directly to olefins. This ability of manganese to hydrogenate in the short resident time in the reactor, is also an important property in catalytically converting sulfate back to $SO_2$, sulfur and $H_2S$ in the reactor, another important contribution of manganese. The ability of manganese to oxidize CO to $CO_2$ and $SO_2$ to $SO_3$ for retention in the regenerator is of equal importance, lowering sulfur in the product gasoline by 10–20% is also important.

EXAMPLE 7

RCC® Catalyst Loaded with High Level of Manganese and Metal Contamination

This example shows the effect of manganese when deposited in higher concentrations on a highly metal contaminated cracking catalyst from commercial operations on reduced crude (RCC® operation) and then blended in varying amounts of 1 to 99% with the same commercial catalysts.

This example shows that impregnation with manganese at very high levels of a residual catalyst containing metal contaminants and then mixing with no-manganese, but metal-contaminated catalyst, results in considerable improvement in performance. (See Table 7.) In this case, a reduced crude catalyst containing a large amount of contaminant metal, 4800 ppm V, 1700 ppm Ni, 8300 ppm Fe and impregnated with 10% manganese is mixed with nine times its weight of the same catalyst, but not containing any manganese, and then subjected to MAT testing. Results of this experiment are shown in Table 7. When this catalyst is blended with one-tenth times its weight of catalyst containing 10% manganese, there is an overall improvement in performance. This can be attributed to the ability of manganese on one catalyst to selectively treat associated no-manganese but metal-loaded catalyst so as to enhance overall performance. In this case a metal contaminated catalyst is loaded with manganese and mixed with non-manganese containing high metal loaded catalyst and then submitted for testing.

TABLE 7

| Sample ID<br>NI 1700 ppm<br>V 4800 ppm<br>Fe 8300 ppm | 100% RCC<br>Catalyst | 90% RCC catalyst<br>mixed with 10% RCC<br>catalyst containing<br>90,000 ppm Mn |
|---|---|---|
| Temperature (° F.) | 915 | 915 |
| Cat:Oil Ratio | 3.0 | 3.0 |
| Manganese | None | 8,900 ppm |
| MAT Activity | | |
| Conversion vol. % | 61.1 | 60.3 |
| $H_2$ wt. % | 0.33 | 0.21 |
| Coke wt. % | 2.78 | 2.47 |
| Gasoline vol. % | 55.97 | 55.76 |
| Gasoline Selectivity (vol. %) | 91.5 | 92.5 |
| Coke Factor | 1.4 | 1.2 |
| $H_2$ Factor | 11.2 | 6.9 |

Table 7 compares MAT testing on this mixed sample as compared with unblended catalyst from the same sample source. Note that although manganese promoted catalyst is only present in 10% concentration, and has not had an impact on activity, all key economic factors, including gasoline selectivity, and hydrogen and coke factors show improvement, selectivity increasing from 91.5 to 92.5 and hydrogen factor dropping from 11.2 to 6.9 and coke factor dropping from 1.4 to 1.2. At present time it is not clear how this effect is manifested. Nevertheless, the presence of a high manganese loaded equilibrium catalyst serves to convey a benefit to all catalysts present, even when the manganese containing catalyst is present in as low a concentration as 10% and this effect is especially significant in the presence of catalysts containing very large amounts of nickel and vanadium.

The process can also be applied to situations where virgin catalyst containing large amounts of manganese as high as to 20 wt. % or more is mixed with equilibrium catalyst from the same operation, containing high levels of vanadium and nickel.

EXAMPLE 8

Magnetic Separation of RCC® Catalyst Loaded with Manganese and Metal Contamination and Mixed with Similar Catalyst Without Manganese This example demonstrates the effect of manganese when deposited in high concentrations on a highly metal contaminated cracking catalyst from commercial operations, and then separated by magnetic separation into varying fractions for recycle or disposal.

An RCC® equilibrium catalyst from cracking of reduced crude is impregnated with 8.9% manganese and blended with nine times its weight of an identical untreated catalyst (as in Example 7) and subjected to repeated magnetic separations by means of a rare earth roller, as described in Hettinger patent U.S. Pat. No. 5,198,098, producing seven cuts (see Table 8).

The various magnetic cuts from this separation are then submitted for MAT testing, and compared with untreated catalyst as well as the original blend. The equilibrium catalyst described above, before impregnation, contained 1700 ppm nickel, 4800 ppm vanadium, 8300 ppm iron and 0.74 wt % $Na_2O$ and had a rare earth composition as follows: lanthanum 5700 ppm, cerium 2100 ppm, praseodymium 800 ppm, and neodymium 2800 ppm.

Table 8 shows the results of MAT testing and the chemical composition of the various cuts in terms of manganese, nickel, iron and vanadium. The data shows again, as previously shown in Example 7, the overriding beneficial effect of manganese in protecting and enhancing catalyst selectivity at all levels of metal poisoning up to and including 20,700 ppm of nickel plus iron plus vanadium. It shows that as long as the ratio of manganese to total metal, or to nickel-plus-vanadium, or to vanadium stays high, selectivity is enhanced. But as this ratio, especially for nickel plus vanadium, or vanadium alone, begins to drop off, selectivity begins to decline, despite the fact that this catalyst contains a very high metal contaminant level.

TABLE 8

MAT Testing of Magnetic Separated Manganese Containing Catalyst

| Catalyst ID | 100% RCC | 90% RCC 10% RCC 89,000 ppm Mn Blend | Blend Cut 1 | Blend Cut 2 | Blend Cut 3 | Blend Cut 4 | Blend Cut 5 | Blend Cut 6 | Blend Cut 7 |
|---|---|---|---|---|---|---|---|---|---|
| Wt. % | 100 | 100 | 13.0 | 15.9 | 15.7 | 15.1 | 14.3 | 7.9 | 17.8 |
| MAT Conv. vol. % | 61.1 | 60.3 | 51.2 | 53.0 | 57.2 | 53.8 | 59.6 | 60.0 | 65.3 |
| Gasoline vol. % | 56.0 | 55.8 | 49.6 | 50.6 | 54.3 | 49.7 | 56.3 | 56.0 | 58.9 |
| Wt. % Coke | 2.78 | 2.47 | 2.52 | 2.68 | 2.57 | 2.30 | 2.36 | 2.61 | 2.62 |
| Wt. % $H_2$ | 0.33 | 0.28 | 0.26 | 0.21 | 0.21 | 0.21 | 0.21 | 0.20 | 0.21 |
| Gasoline Selectivity (vol. %) | 91.5 | 92.5 | 93.1 | 92.0 | 92.9 | 93.0 | 92.7 | 91.7 | 89.2 |
| Nickel ppm | 1700 | 1700 | 2300 | 2400 | 2200 | 2000 | 1700 | 1700 | 1300 |
| Iron ppm | 8300 | 8300 | 13300 | 10200 | 9200 | 8600 | 7700 | 7600 | 6500 |
| Vanadium ppm | 4800 | 4800 | 5100 | 5200 | 5300 | 5200 | 4900 | 4800 | 4200 |
| Manganese | 0 | 8900 | 17900 | 14600 | 10700 | 8800 | 6300 | 5100 | 2000 |

TABLE 8-continued

MAT Testing of Magnetic Separated Manganese Containing Catalyst

| Catalyst ID | 100% RCC | 90% RCC 10% RCC 89,000 ppm Mn Blend | Blend Cut 1 | Blend Cut 2 | Blend Cut 3 | Blend Cut 4 | Blend Cut 5 | Blend Cut 6 | Blend Cut 7 |
|---|---|---|---|---|---|---|---|---|---|
| Total Ni + Fe + V | 14900 | 14900 | 20700 | 17800 | 16700 | 15800 | 14300 | 14100 | 12000 |
| Manganese / Nickel + Vanadium | 0 | 1.37 | 2.42 | 1.92 | 1.42 | 1.22 | 0.95 | 0.78 | 0.36 |
| Total Ni + V | 6500 | 6500 | 7400 | 7600 | 7500 | 7200 | 6600 | 6500 | 5500 |
| Manganese / Vanadium | 0 | 1.85 | 3.50 | 2.80 | 2.01 | 1.69 | 1.28 | 1.06 | 0.48 |
| Sodium (wt. %) | 0.56 | 0.57 | 0.57 | 0.57 | 0.57 | 0.57 | 0.57 | 0.57 | 0.57 |

Figure 7:
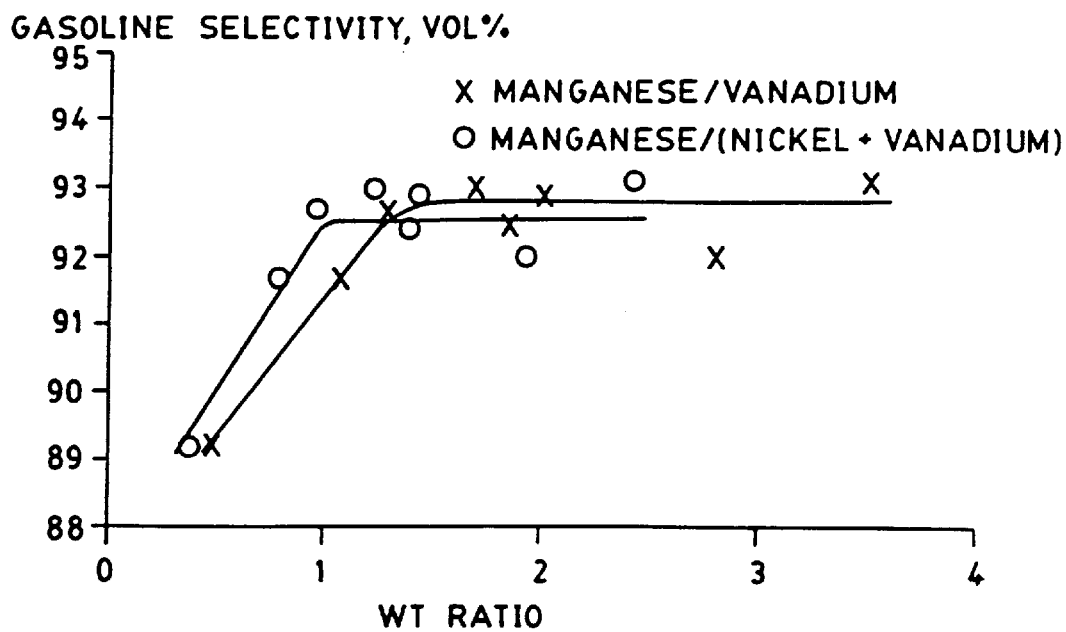
FIG. 7 is a plot of gasoline selectivity versus weight ratio of (X) manganese:vanadium, and (O) manganese:nickel+ vanadium. (See Example 8 and Table 8.)

FIG. 7 shows a plot of selectivity versus manganese to metal ratio. Note how rapidly selectivity falls off as the ratio of manganese to vanadium drops to one to one, and is unable to protect catalyst against loss in selectivity. It shows the beneficial effect of very high levels of manganese on catalyst performance.

EXAMPLE 9

Selectivity Enhancement with a Second "Magnetic Hook" Additive, Chromium

Table 9 compares the results of MAT testing of a chromium promoted low rare earth containing cracking catalyst. This catalyst was prepared in a manner similar to manganese promoted catalyst in Example 1 and contained 18,300 ppm of chromium. In this test the chromium promoted catalyst had a vol % selectivity of 82.3% compared to 81.4% for the non-promoted catalyst. It also made slightly less hydrogen.

TABLE 9

"Magnetic Hook" Study

| Catalyst Metal | Base Catalyst None | Base Catalyst Chromium |
|---|---|---|
| Steaming Temperature (° F.) | 1425 | 1425 |
| Steaming Time (hours) | 24 | 24 |
| Feed Stock | RPS | RPS |
| Cat:Oil Ratio | 4.60 | 4.51 |
| Reaction Temperature (° F.) | 960 | 960 |
| Reaction Time (seconds) | 25 | 25 |
| Conversion (wt. %) | 67.37 | 66.26 |
| Conversion (vol. %) | 69.09 | 67.87 |
| C5–430° F. Gasoline | 46.42 (56.24) | 46.15 (55.92) |
| 430–650° F. LCGO | 22.35 (21.95) | 23.18 (22.88) |
| 650° F.+ Decanted Oil | 10.28 (8.96) | 10.56 (9.25) |
| Hydrogen Wt. % | 0.11 | 0.10 |
| Wt. % Selectivity | 68.9 | 69.7 |
| Vol. % Selectivity | 81.4 | 82.4 |

EXAMPLE 10

Impregnation Versus Ion Exchange of Manganese in Catalyst Preparation

Base catalyst, a low rare earth-containing catalyst of 0.15 wt. % rare earth oxide, is impregnated with manganese as described in Example 2, and compared with an ion exchange manganese-containing catalyst using a solution of 2N, MnSO$_4$ The final manganese sulfate ion exchanged catalyst contains 4100 ppm of manganese. Samples of base catalyst, along with these two catalysts, are MAT tested at 3, 4 and 5 cat:oil ratios, and the results are shown in Table 10.

TABLE 10a

Effect of Manganese on Cracking Yields
MAT Data on AKC#1

| Catalyst ID | AKC #1 Base | Mn Impreg | Mn Exch | Re Impreg |
|---|---|---|---|---|
| Cat:Oil Ratio | 2.9 | 2.9 | 3.0 | 3.0 |
| Temperature ° F. | 915 | 915 | 915 | 915 |
| Weight % Yields | | | | |
| AOI Relative Activity | 35 | 100 | 127 | 34 |
| Conversion | 64.9 | 73.2 | 75.0 | 65.4 |
| Hydrogen | 0.05 | 0.05 | 0.06 | 0.04 |
| Methane | 0.30 | 0.34 | 0.35 | 0.25 |
| Ethane/Ethylene | 0.58 | 0.70 | 0.80 | 0.54 |
| Propane | 0.58 | 0.93 | 1.00 | 0.52 |
| Propylene | 3.53 | 3.55 | 4.05 | 3.47 |
| Isobutane | 3.63 | 5.08 | 5.00 | 3.55 |
| I-Butene/Isobutene | 2.26 | 1.76 | 1.86 | 2.30 |
| N-Butane | 0.59 | 1.06 | 0.94 | 0.55 |
| Butadiene | 0.00 | 0.00 | 0.00 | 0.00 |
| Cis-2-Butene | 0.99 | 1.02 | 1.02 | 1.03 |
| Trans-2-Butene | 1.36 | 1.36 | 1.38 | 1.41 |
| CO, CO$_2$, COS, H$_2$S | 0.33 | 0.35 | 0.29 | 0.30 |
| C$_5$-430° F. | 48.42 | 53.77 | 54.97 | 49.21 |
| 430°–630° F. | 17.46 | 16.39 | 15.85 | 18.11 |
| 630° F. | 17.63 | 10.41 | 9.19 | 16.45 |
| Coke | 2.28 | 3.23 | 3.24 | 2.26 |
| Wt. % Selectivity | 74.6 | 73.7 | 73.2 | 75.2 |
| Wt. % isobutane + 1-butene/isobutene | 5.89 | 6.84 | 6.86 | 5.85 |
| iC$_4$ / 1-butene/isobutene | 1.61 | 2.89 | 2.69 | 1.54 |

TABLE 10b

Effect of Manganese on Cracking Yields
MAT Data on AKC#1

| Catalyst ID | AKC #1 Base | Mn Impreg | Mn Exch | Re Impreg |
|---|---|---|---|---|
| Cat:Oil Ratio | 4.0 | 4.0 | 3.9 | 4.1 |
| Temperature ° F. | 915 | 915 | 915 | 915 |

TABLE 10b-continued

Effect of Manganese on Cracking Yields
MAT Data on AKC#1

| Catalyst ID | AKC #1 Base | Mn Impreg | Mn Exch | Re Impreg |
|---|---|---|---|---|
| Weight % Yields | | | | |
| AOI Relative Activity | 90 | 162 | 167 | 59 |
| Conversion | 74.9 | 78.8 | 78.9 | 71.3 |
| Hydrogen | 0.07 | 0.07 | 0.07 | 0.05 |
| Methane | 0.38 | 0.44 | 0.46 | 0.32 |
| Ethane/Ethylene | 0.73 | 0.90 | 0.97 | 0.67 |
| Propane | 0.78 | 1.30 | 1.36 | 0.73 |
| Propylene | 4.43 | 3.98 | 4.37 | 4.05 |
| Isobutane | 4.63 | 6.06 | 6.16 | 4.71 |
| 1-Butene/Isobutene | 2.48 | 1.52 | 1.82 | 2.36 |
| N-Butane | 0.79 | 1.37 | 1.32 | 0.78 |
| Butadiene | 0.00 | 0.00 | 0.00 | 0.00 |
| Cis-2-Butene | 1.21 | 0.99 | 1.08 | 1.15 |
| Trans-2-Butene | 1.64 | 1.32 | 1.47 | 1.57 |
| CO, $CO_2$, COS, $H_2S$ | 0.35 | 0.33 | 0.35 | 0.36 |
| $C_5$–430° F. | 54.28 | 56.05 | 55.35 | 51.56 |
| 430°–630° F. | 15.82 | 14.27 | 13.90 | 17.08 |
| 630° F. | 9.28 | 6.97 | 7.32 | 11.63 |
| Coke | 3.15 | 4.42 | 4.09 | 2.98 |
| Wt. % Selectivity | 72.5 | 71.1 | 70.1 | 72.3 |
| Wt. % isobutane + 1-butene/isobutene | 7.11 | 7.58 | 7.98 | 7.07 |
| $iC_4$ / 1-butene/isobutene | 1.87 | 3.98 | 3.38 | 1.99 |

TABLE 10c

Effect of Manganese on Cracking Yields
MAT Data on AKC#1

| Catalyst ID | AKC #1 Base | Mn Impreg | Mn Exch | Re Impreg |
|---|---|---|---|---|
| Cat:Oil Ratio | 4.8 | 5.1 | 5.2 | 5.1 |
| Temperature ° F. | 915 | 915 | 915 | 915 |
| Weight % Yields | | | | |
| AOI Relative Activity | 118 | 168 | 146 | 75 |
| Conversion | 78.4 | 81.3 | 80.4 | 75.5 |
| Hydrogen | 0.08 | 0.08 | 0.08 | 0.07 |
| Methane | 0.45 | 0.52 | 0.56 | 0.40 |
| Ethane/Ethylene | 0.84 | 1.02 | 1.12 | 0.78 |
| Propane | 0.97 | 1.65 | 1.68 | 0.91 |
| Propylene | 4.70 | 4.08 | 4.24 | 4.49 |
| Isobutane | 5.71 | 6.82 | 6.48 | 5.25 |
| I-Butene/Isobutene | 1.46 | 1.58 | 1.45 | 2.32 |
| N-Butane | 1.02 | 1.65 | 1.53 | 0.95 |
| Butadiene | 0.00 | 0.00 | 0.00 | 0.00 |
| Cis-2-Butene | 1.23 | 0.98 | 0.90 | 1.23 |
| Trans-2-Butene | 1.67 | 1.31 | 1.21 | 1.63 |
| CO, $CO_2$, COS, $H_2S$ | 0.32 | 0.37 | 0.33 | 0.36 |
| $C_5$–430° F. | 55.90 | 55.96 | 55.0 | 53.22 |
| 430°–630° F. | 14.25 | 12.86 | 13.03 | 15.41 |
| 630° F. | 7.38 | 5.82 | 6.53 | 9.10 |
| Coke | 4.02 | 5.30 | 5.85 | 3.88 |
| Wt. % Selectivity | 71.3 | 68.8 | 68.4 | 70.4 |
| Wt. % isobutane + 1-butene/isobutene | 7.17 | 8.40 | 7.93 | 7.57 |
| $iC_4$ / 1-butene/isobutene | 3.91 | 4.32 | 4.47 | 2.26 |

Figure 8:
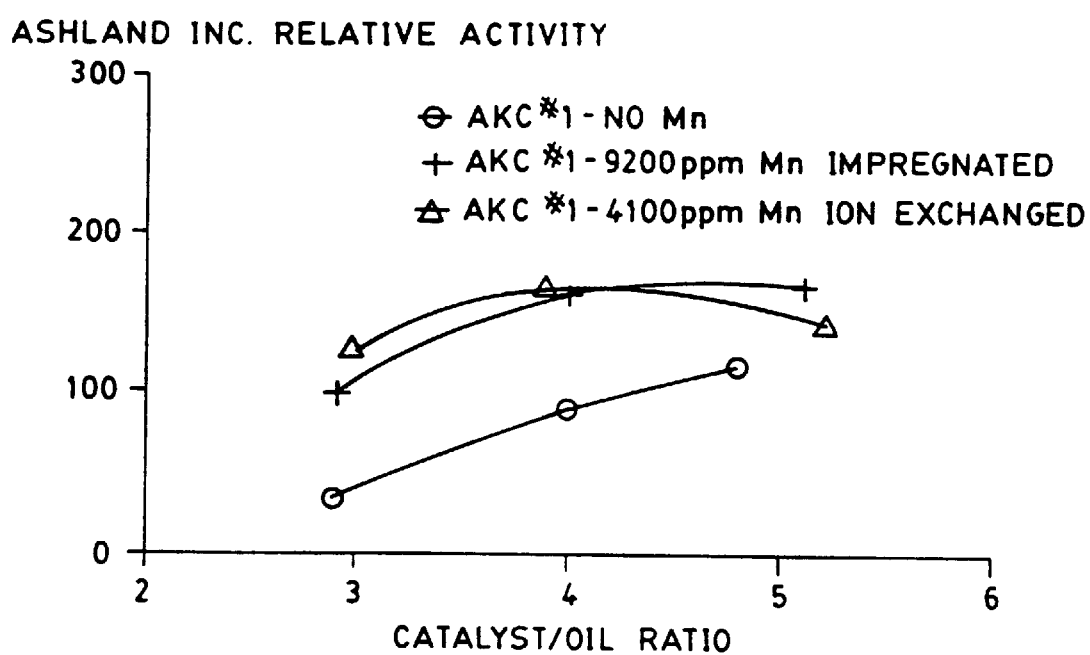
FIG. 8 is a plot of relative activity versus cat:oil ratio comparing no manganese with 9200 ppm manganese added by an impregnation technique and with 4000 ppm manganese added by an ion exchange technique. (See Example 10 and Tables 10a, 10b and 10c.)
Figure 9:
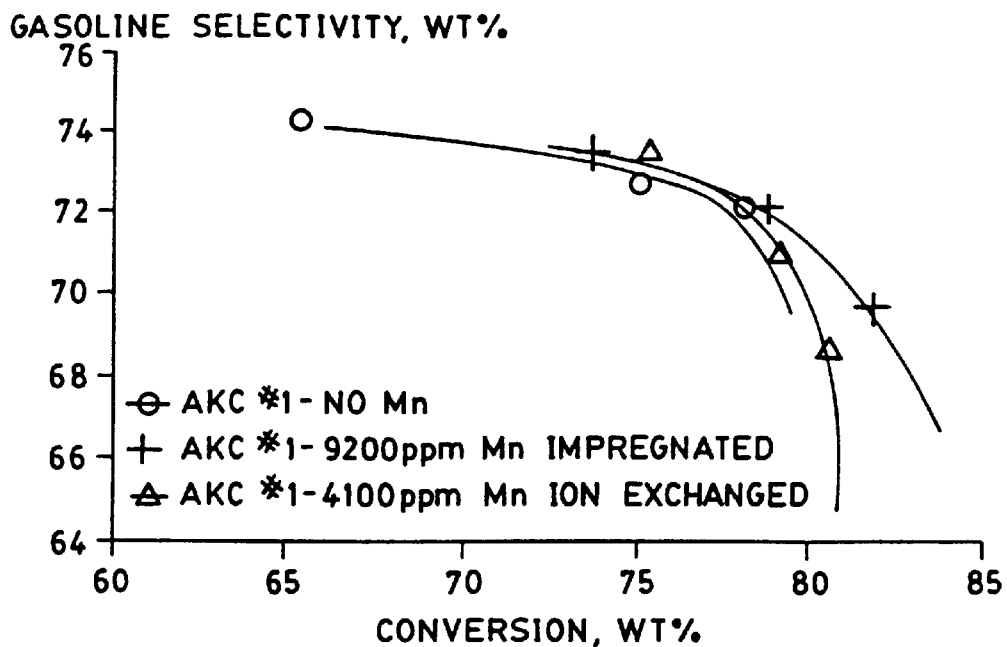
FIG. 9 is a plot of gasoline selectivity versus conversion comparing no manganese versus 9200 ppm impregnated manganese and 4000 ppm ion exchanged manganese. (See Example 10 and Tables 10a, 10b and 10c.)

FIG. 8 is a plot of activity versus cat:oil and shows that the ion exchanged manganese-containing catalyst is as active as the manganese impregnated catalyst, with only 4000 ppm of manganese. Selectivity plotted versus wt. % conversion in FIG. 9 further confines manganese's ability to enhance selectivity even when present at a low of 4000 ppm concentration.

EXAMPLE 11

Comparison of Manganese Versus Rare Earth Ion Exchange AKC #1

The low rare earth containing catalyst (0.15 wt. %) is treated by a similar ion exchange method with a solution of rare earth so as to increase rare earth content in order to compare the effect of manganese ion exchange catalyst compared with that of high rare earth containing catalyst. Rare earths have been used since the early 1960s to enhance cracking catalyst activity. After ion exchange, the rare earth content increases almost ten fold from 0.15 wt. % to 1.11 wt. %, or 1500 ppm to 11,000 ppm. All samples begin with 1500 ppm rare earths (RE).

Figure 10:
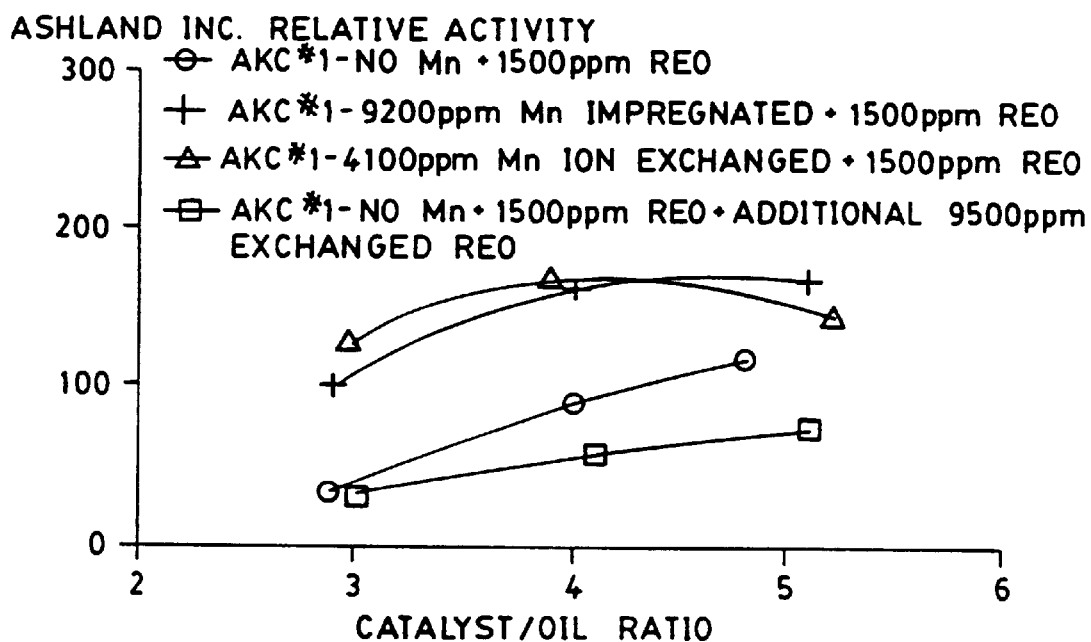
FIG. 10 is a plot of Ashland relative activity versus cat:oil ratio comparing catalysts with and without manganese at different levels of rare earth. (See Example 11 and Table 10.)
Figure 11:
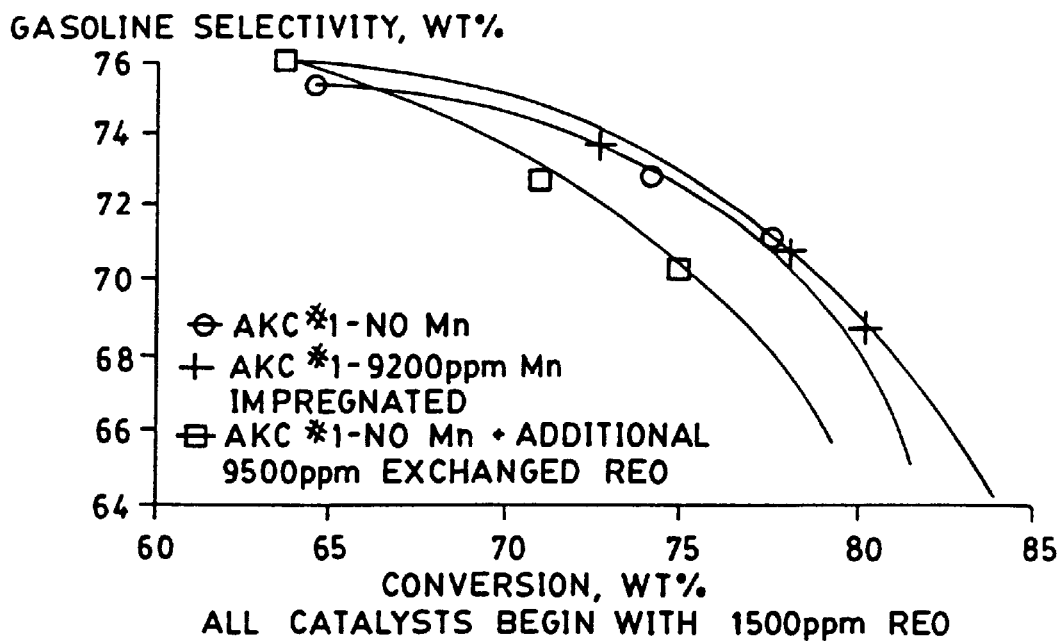
FIG. 11 is a plot of gasoline selectivity versus gasoline conversion comparing no manganese with impregnated rare earth elements and ion-exchanged manganese, showing manganese, surprisingly, is more effective than rare earths. (See Example 11 and Table 10.)

Data shown in Table 10 also contain data from the rare earth promoted catalyst. FIG. 10 also shows the activity of high rare earth promoted catalyst versus the untreated AKC catalyst and the two manganese-containing catalysts. It shows that the rare earths, as compared to manganese, actually lower activity significantly as compared to manganese and the untreated catalyst. Selectivity-wise, the results show that the rare earths are actually detrimental as shown in FIG. 11. These results further demonstrate the unique ability of manganese to enhance both activity and selectivity.

EXAMPLE 12

Increased Production of Isobutane and Lower Olefins

Figure 12:
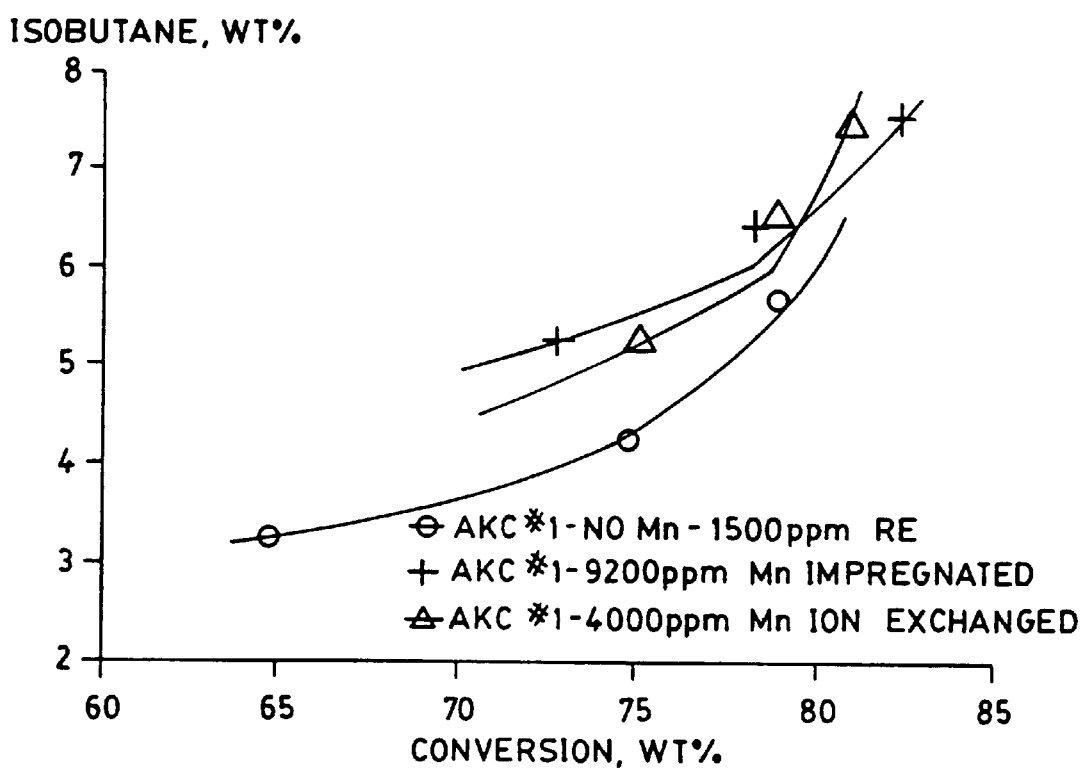
FIG. 12 is a plot of wt. % isobutane (in mixture with 1-butene/isobutene) versus wt. % conversion for catalysts with no manganese and with 9200 and 4000 ppm manganese. (See Example 12 and Table 10.)
Figure 13:
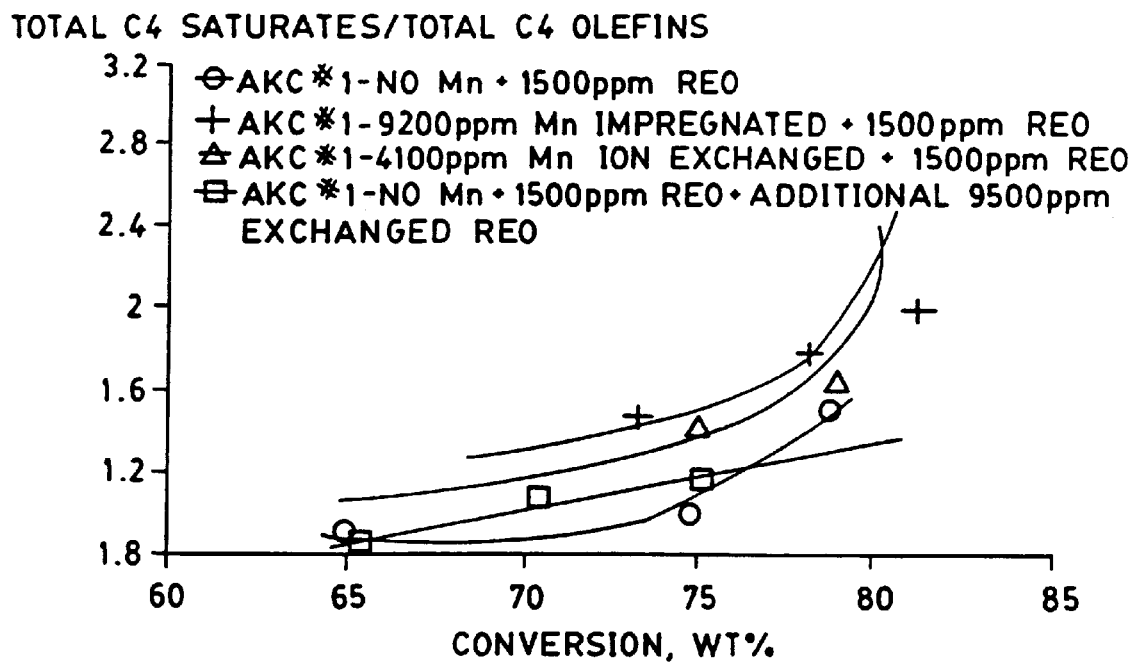
FIG. 13 is a plot of the ratio of $C_4$ saturates to $C_4$ olefins versus wt. % conversion comparing manganese at levels of 4000 ppm, 9200 pm with no manganese and no manganese plus 11,000 ppm rare earth. (See Example 12 and Table 10.)

The results of experiments presented in Table 10 also demonstrate that manganese changes the cracking characteristics of these catalysts in a way not previously reported. Previously, the rare earths, as also demonstrated here, were able to transfer hydrogen to olefins and reduce olefin content of the finished product. Unfortunately, as a result, because of the high octane value of olefins, octane numbers drop. It now appears that manganese changes the acidic properties sufficiently so as to increase isomerization before cracking and isobutane production after cracking, while also acting to reduce olefin content. FIG. 12 presents the yield of isobutane versus wt. % conversion and shows manganese significantly changes the yield of isobutane at constant conversion by 10–13% at 75 wt. % conversion. This demonstrates a distinctly different cracking behavior. Plotting the ratio of total $C_4$ saturates divided by the total $C_4$ olefins, shown in FIG. 13 further demonstrates manganese's unique ability to transfer hydrogen to olefins. Note that both low rare earth and high rare earth catalysts do not show this ability to any degree compared to the manganese supported catalysts, thus demonstrating manganese's high hydrogenation activity.

EXAMPLE 13

Effect of High Levels of Manganese on Catalyst Performance

Three catalysts were impregnated with very high levels of manganese by the following procedure. A finished catalyst containing 16.4 wt. % of manganese is prepared as follows: 36.4 grams of manganese acetate hydrate is dissolved in 26 ml of hot distilled water and heated to boiling for complete solution. This is mixed with 40 grams of DZ-40 dispersed in 50 ml of boiling water. The solution slurry mixture is kept at boiling temperature for two hours after which it is allowed to air dry, and then placed in an oven at 110° C. until drying is complete. This sample is then placed in an Erlenmeyer flask and slowly raised to 1200° F. where it is calcined for four hours. It is then cooled and submitted for MAT testing and chemical analysis.

All other samples listed in Table 11 were prepared and treated in the same way.

Volume % selectivity is exceptionally high for RCC® catalyst containing manganese. Even though conversion fell off with high levels of metal present in this catalyst, selectivity (vol. %) remained at one of the highest levels, 90.4 vol. %, demonstrating that even at contaminating levels as high as 6200 ppm of Ni+V and 9600 ppm for iron, manganese still has a unique impact on gasoline selectivity while limiting the behavior of nickel and vanadium.

TABLE 11

High Manganese Catalyst Performance
MAT Test 915° F. 3.0 Cat: Oil Ratio

| Catalyst ID | 1C | 1A | 1B | 2C | 2A | 2B | 3C | 3A | 3B |
|---|---|---|---|---|---|---|---|---|---|
| Catalyst | DZ-40 | DZ-40 | DZ-40 | RCC | RCC | RCC | RPS-F | RPS-F | RPS-F |
| Wt. % Mn | 0 | 10.3 | 16.4 | 0 | 10.1 | 18.9 | 0 | 6.6 | 17.1 |
| ppm Mn | 0 | 103,000 | 164,000 | 0 | 101.000 | 189.000 | 0 | 66.000 | 171.000 |
| ppm Fe | 4554 | 4209 | 4437 | 9600 | 8970 | 7866 | 3180 | 2900 | 2760 |
| ppm Ni | 50 | 41 | 38 | 2072 | 1914 | 1662 | 43 | 39 | 32 |
| ppm V | 58 | 44 | 38 | 4169 | 3820 | 3348 | 116 | 107 | 88 |
| MAT Vol % Conv | 79.8 | 71.1 | 62.6 | 60.3 | 31.5 | 25.8 | 93.7 | 88.6 | 76.2 |
| AOI RA | 172 | 64 | 24 | 19.1 | 0.7 | 0.4 | 830 | 466 | 114 |
| Corrected and Normalized Yield | | | | | | | | | |
| Wt. % $C_5$-430° F. | 46.1 | 48.8 | 45.2 | 46.3 | 26.9 | 20.7 | 42.7 | 51.8 | 51.6 |
| Vol $C_5$-430° F. | 56.9 | 59.4 | 54.9 | 56.0 | 32.6 | 25.2 | 53.4 | 63.9 | 62.9 |
| Wt. % Coke | 7.2 | 4.59 | 4.26 | 2.78 | 3.30 | 5.12 | 16.31 | 10.83 | 7.15 |
| Wt. % conv of >430° F. | 77.1 | 68.4 | 62.0 | 59.9 | 35.6 | 31.0 | 91.0 | 85.4 | 73.7 |
| Vol % conv of >430° F. | 78.6 | 70.2 | 63.5 | 61.1 | 36.1 | 31.3 | 92.8 | 87.6 | 75.6 |
| Wt. % C5-430° F. select | 59.7 | 71.3 | 72.9 | 77.3 | 75.6 | 66.9 | 46.9 | 60.7 | 70.1 |
| Vol % C5-430° F. select | 72.4 | 84.5 | 86.4 | 91.5 | 90.4 | 80.3 | 57.5 | 72.9 | 83.2 |
| Wt. % Hydrogen | 0.15 | 0.10 | 0.08 | 0.33 | 0.18 | 0.13 | 0.18 | 0.18 | 0.12 |

These three catalysts are: 1) a virgin Davison catalyst DZ-40, developed jointly by Ashland Petroleum Company and Davison, division of W. R. Grace & Co., for reside cracking, and covered by U.S. Pat. Nos. 4,440,868; 4,480,047; 4,508,839; 4,588,702; and 4,612,298 and described in a publication "Development of a Reduced Crude Cracking Catalyst" by W. P. Hettinger, Jr.; Catalytic; Chapter 19, pages 308–340; In Fluid Cracking ACS Symposium Series 375; M. Occelli, Editor 1988; 2) a second catalyst is an equilibrium catalyst taken from the regenerator of the original residual cat cracker, the extensively patented RCC® unit invented by Ashland Petroleum Company and first placed in operation in Catlettsburg, Ky., in 1983. This is labeled RCC® equilibrium catalyst; 3) the third catalyst is a reside type virgin catalyst obtained from Refining Process Services and labeled RPS-F.

Table 11 presents the results of tests on these three catalysts when containing intermediate and very high levels (164,000–189,000 ppm) (16.4–18.9 wt. %) of manganese. It will be noted that although such high levels of manganese began to reduce activity, production of gasoline is actually greater in many cases, again confirming that even at very high levels of manganese, (16.4–18.9 wt. %) some significant activity is still maintained, and more importantly, selectivity is generally enhanced.

For example, for DZ-40 at 10.3 wt. % manganese, the yield of gasoline is 59.4 vol. %; a very high liquid recovery, and much greater than the 56.9 vol. % gasoline when manganese is absent. Volume % selectivity for 16.4 wt. % Mn is 86.4, a very high value compared with 72.4 vol. % for untreated catalyst.

Finally, in the third series, manganese has a very positive impact on gasoline, amounting to 62.9 vol. % gasoline when the catalyst contained 17.1 wt. % of manganese, and 63.9 vol. % yield at 6.6 wt. % of manganese.

This confirms that catalyst containing manganese at levels as high as 18.9 wt. % can maintain a superior selectivity for making gasoline with metals on catalyst as high as 2072 ppm of Ni, 4169 ppm of vanadium, 9600 ppm of iron, and 5500 ppm (0.55 wt. %) of sodium.

EXAMPLE 14

Carbon and Carbon Monoxide Oxidation Promotor

Figure 14:
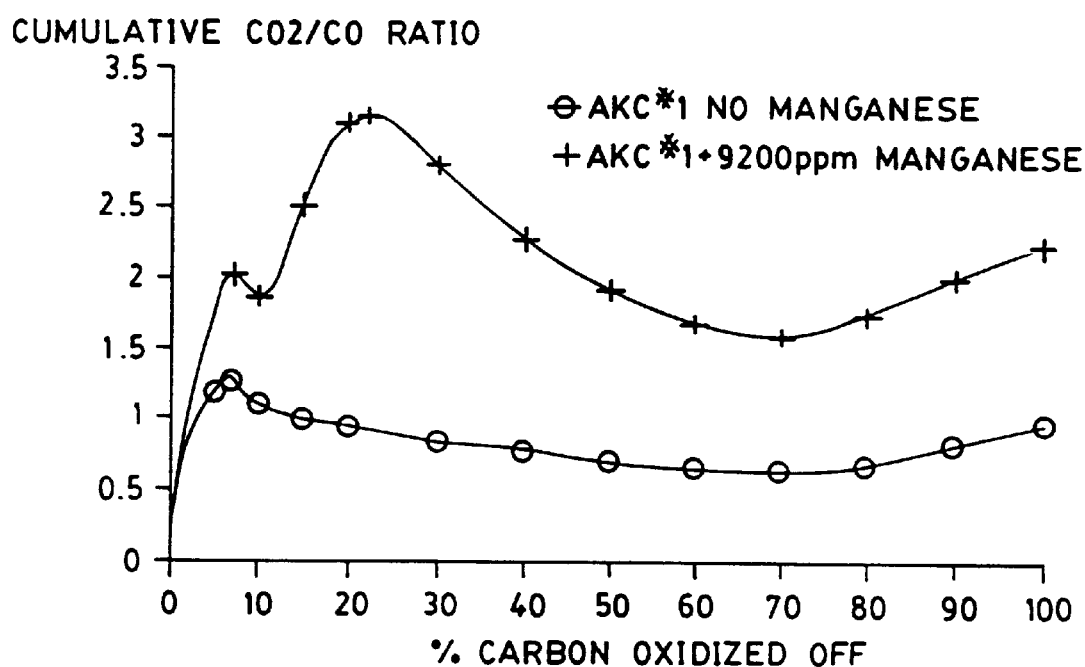
FIG. 14 is a plot of the $CO_2$:CO ratio versus percent carbon oxidized off during generation (See Example 14) with and without manganese.

In carrying out regeneration of spent catalysts from catalytic cracking, the ability of a catalyst to enhance the burning rate of coke to carbon monoxide and convert to carbon dioxide is a key property. In particular, the ability to quickly convert CO to $CO_2$ and rapidly establish equilibrium between, oxygen, carbon monoxide and carbon dioxide is desirable. An even more critical characteristic of an oxidation catalyst is how quickly it can establish this equilibrium so that heat balance and temperature control are easily maintained. Great fluctuations in burning rate which can occur in pockets of the regenerator can cause very large temperature rises. FIG. 14 shows that manganese incorporated cracking catalyst, in addition to its other unique properties, is a superior oxidative catalyst.

Samples of the commercial catalyst AKC #1 with and without 9200 ppm of manganese are steamed for 5 hours at 788° C. with 0.0070 steam.

For carbon oxidation testing, the steamed catalysts with and without manganese are farther impregnated with about are then submitted to MAT testing at 2.5, 3 and 4 cat:oil ratio (see Table 12).

TABLE 12

MAT Test Summary

|  | No Manganese | | | With 2000 ppm Manganase | | | |
| --- | --- | --- | --- | --- | --- | --- | --- |
| MAT Test No. | B-6025 | B-6026 | E-2858 | C-5176 | B-6049 | B-6060 | B-6070 |
| Cat:Oil Ratio | 2.5 | 3.0 | 4.1 | 2.6 | 2.9 | 3.0 | 3.9 |
| Coiversion (wt. %) | 67.8 | 71.2 | 74.2 | 66.1 | 70.8 | 71.1 | 75.5 |
| Yields (wt. %) | | | | | | | |
| Dry Gas | 1.87 | 2.34 | 2.21 | 1.49 | 1.82 | 1.98 | 2.32 |
| Hydrogen SCFB | 339 | 432 | 414 | 257 | 368 | 356 | 414 |
| Hydrogen | 0.58 | 0.74 | 0.71 | 0.44 | 0.63 | 0.61 | 0.71 |
| Methane | 0.43 | 0.56 | 0.54 | 0.33 | 0.40 | 0.45 | 0.55 |
| Ethane + Ethylene | 0.86 | 1.04 | 0.96 | 0.72 | 0.79 | 0.92 | 1.06 |
| Wet Gas | 12.06 | 13.70 | 13.97 | 11.33 | 12.30 | 12.18 | 14.23 |
| Propane | 0.80 | 0.99 | 1.23 | 0.81 | 0.81 | 0.97 | 1.29 |
| Propylene | 3.16 | 3.63 | 3.36 | 2.95 | 3.25 | 3.17 | 3.46 |
| Isobutane | 3.71 | 4.36 | 4.81 | 3.64 | 3.79 | 3.92 | 4.92 |
| 1-Butene + Isobutylene | 1.68 | 1.76 | 1.49 | 1.46 | 1.64 | 1.47 | 1.47 |
| N-Butane | 0.72 | 0.87 | 1.10 | 0.68 | 0.76 | 0.78 | 1.08 |
| Butadiene | 0.00 | 0.00 | 0.00 | 0.00 | 0.00 | 0.00 | 0.00 |
| Cis-2-Butane | 0.85 | 0.89 | 0.85 | 0.76 | 0.88 | 0.79 | 0.85 |
| Trans-2-Butene | 1.14 | 1.20 | 1.13 | 1.03 | 1.17 | 1.08 | 1.16 |
| Gasoline (wt. %) | 48.89 | 48.72 | 50.00 | 48.27 | 51.45 | 51.00 | 51.35 |
| Cycle Oil (wt. %) | 18.96 | 16.65 | 16.46 | 19.26 | 17.91 | 17.79 | 15.65 |
| Slurry (wt. %) | 13.19 | 12.17 | 9.34 | 14.66 | 11.34 | 11.06 | 8.85 |
| Coke (wt. %) | 4.83 | 6.23 | 7.94 | 4.62 | 5.02 | 5.78 | 7.49 |
| Selectivity (wt. %) | 72 | 68 | 67 | 73 | 73 | 72 | 68 |

0.30 wt. % Ni, using nickel octoate. The impregnated samples are then coked at 500° C. using isobutylene to 2.5–3.5 wt. % carbon. Carbon burning rate is then determined by passing air over the catalyst samples at 718° C. with a flow of 0.25 SCF/hr/g of catalyst.

FIG. 14 shows that burning of carbon to high ratios of $CO_2$ over CO occurs very quickly over the manganese containing catalyst, rising to a ratio of $CO_2$:CO of 2.0 after 10% has been burned, and remains at 2:1 after 50% has been removed. This relative burning rate of up to 3:1 or greater compared with non-manganese containing catalyst confirms the efficiency of manganese promoted catalysts as also superior oxidation catalysts.

EXAMPLE 15

Superior Manganese Supported Cracking Catalyst Prepared by On-Stream Deposition and in the Presence of Nickel and Vanadium A catalyst containing 1100 ppm nickel and 2100 ppm vanadium is prepared by spiking an RCC LCO with nickel octoate and vanadyl naphthanate and depositing the metals over 10 cycles of cracking and regeneration in a fixed-fluidized bed. This catalyst, however, is a moderate rare earth containing catalyst, 1.23 wt. %, and has been steam treated in a fixed-fluidized bed prior to impregnation with metals. A second sample is prepared by depositing manganese octoate dispersed in RCC® light cycle oil along with nickel octoate and vanadyl naphthanate on a second aliquot of the steam treated catalyst. As with the base, no-manganese sample, the metals are cracked onto the catalyst over 10 reaction/regeneration cycles in a fixed-fluidized bed. Total manganese deposited on the catalyst is 2000 ppm. The two catalysts (with and without manganese)

Figure 15:
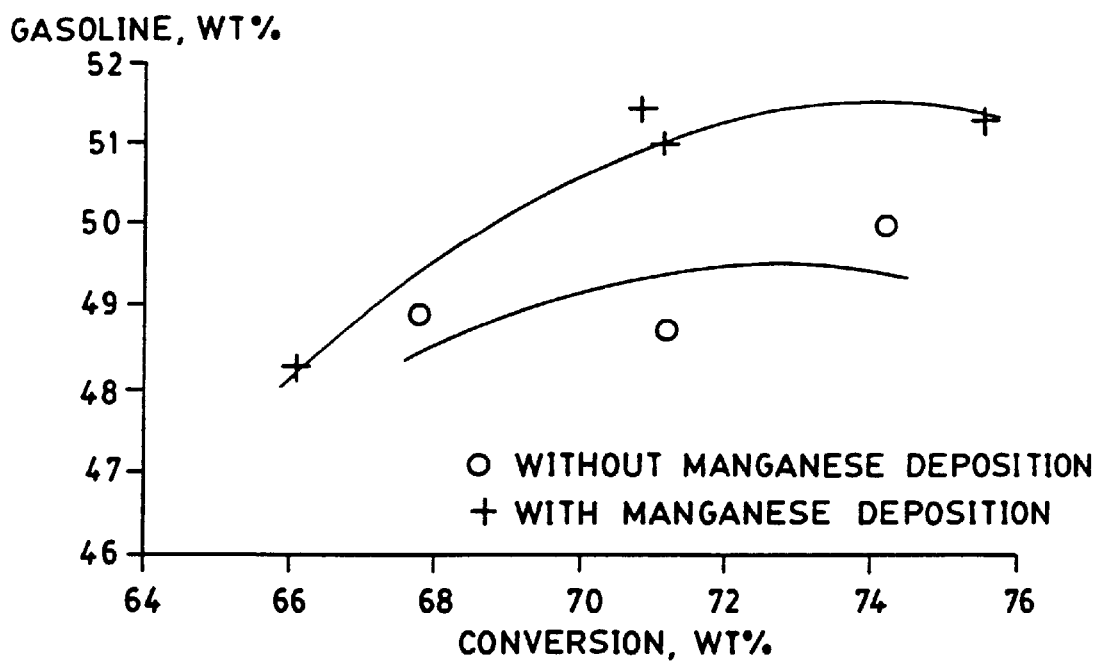
FIG. 15 is a plot of wt. % gasoline versus wt. % conversion for catalysts with and without manganese and 3200 ppm Ni+V showing improved gasoline yield with manganese. (See Example 15 and Table 12.)
Figure 16:
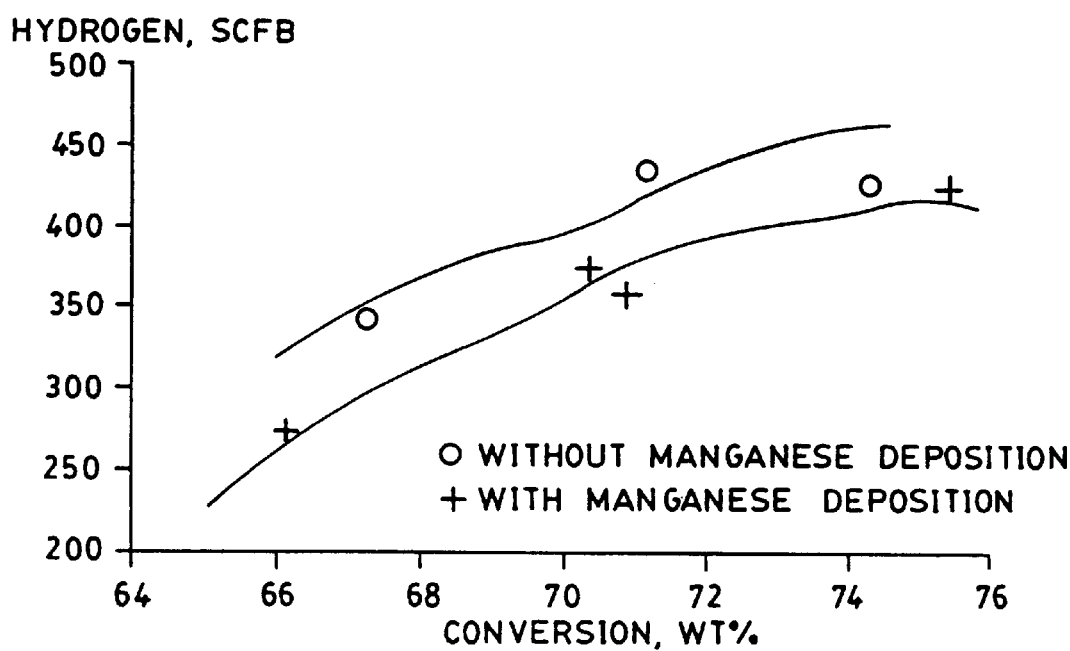
FIG. 16 is a plot of hydrogen-make versus conversion showing the improved (reduced) hydrogen make with manganese being deposited as an additive during cracking. (See Example 15 and Table 12.)

FIG. 15 shows the yield of gasoline as a function of wt. % conversion. At 72 wt. % conversion, for example, there is 2 wt. % increase in gasoline. As pointed out in earlier examples, such an increase has a very major impact on income. In addition to this appreciable selectivity enhancement, FIG. 16 shows the reduction in hydrogen production amounting to an 8–17% reduction over a conversion of 68–74 wt. %. Coke reduction also is significant, amounting to 14% at 73 wt. % conversion.

Figure 17:
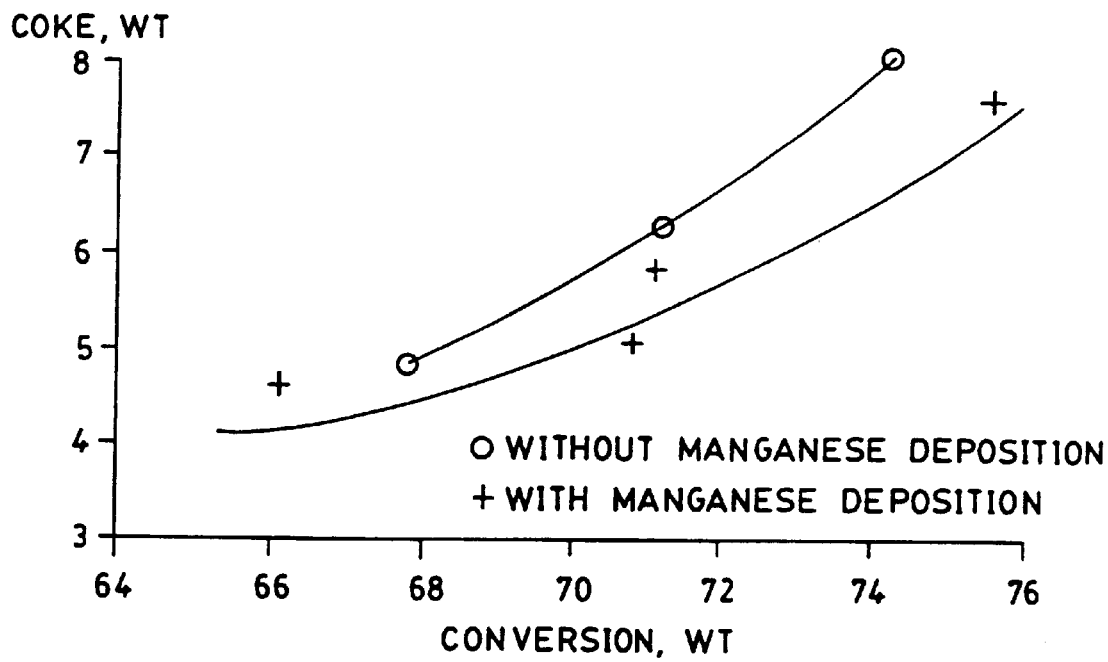
FIG. 17 is a plot of coke-make versus conversion showing the improved (reduced) coke make with manganese being deposited as an additive during cracking. (See Example 15 and Table 12.)
Figure 18:
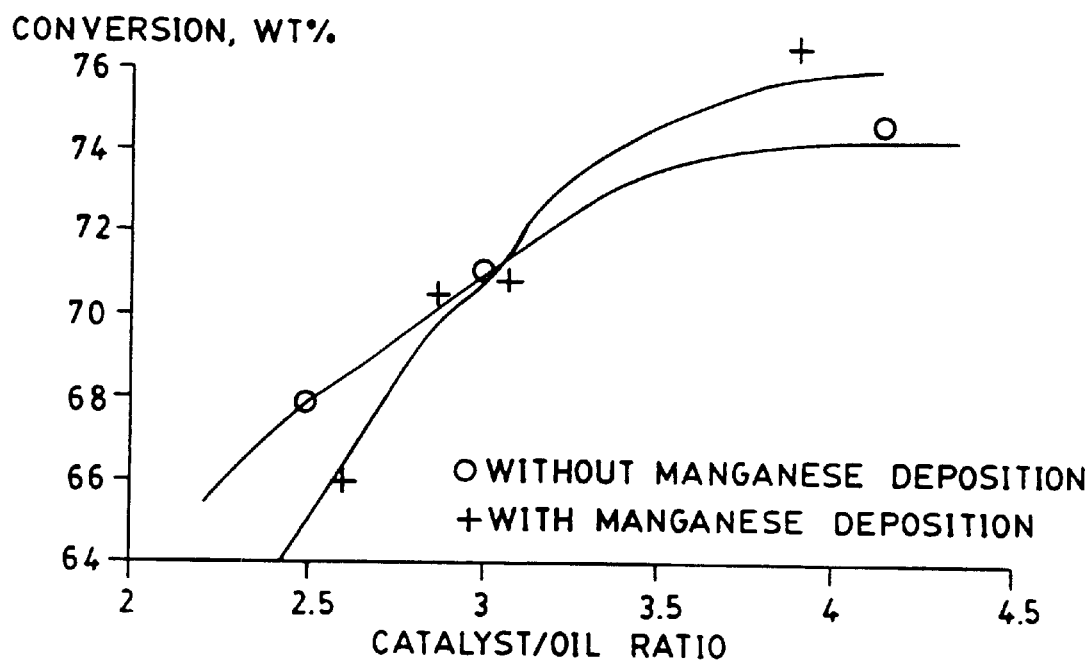
FIG. 18 is a plot of conversion versus cat:oil ratio showing the improved conversion with manganese at cat:oil ratios above about 3. (See Example 15 and Table 12.)

This example clearly demonstrates that as little as 2000 ppm of manganese offsets the effect of nickel and vanadium in terms of gasoline yield, coke and hydrogen. (See FIGS. 15–17) It also demonstrates that a manganese-promoted catalyst can be realized by deposition on a circulating catalyst to reach a concentration appropriate for feedstocks with varying metal levels.

EXAMPLE 16

Magnetic Hook Properties of these Selective Cracking Catalysts

All of the catalysts used in preceding examples, possess among other attributes, highly magnetic properties. While it is only possible to speculate at this time, it may be that the unusual properties of "magnetic hook" promoted catalysts can be attributed to the unimpaired electrons associated with "magnetic hook" elements. It seems quite likely that they may provide an environment which changes in a very subtle, but beneficially significant way, the nature of the cracking mechanism.

Table 13 shows the magnetic properties of catalysts cited in previous examples. It is apparent that all "magnetic hook" promoted catalysts, showing the unusual selectivity properties of the invention have a magnetic susceptibility value greater than $1.0 \times 10^{-6}$ emu/g, or in the case of metal contaminated catalysts, an increase in magnetic susceptibility greater than $1.0 \times 10^{-6}$ emu/g, when incorporated as a "magnetic hook" promoter.

TABLE 13

| Catalyst<br>All virgin catalysts after calcination<br>at 1200° F. for 4 hours | Magnetic Susceptibility<br>Xg × $10^{-6}$ emu/g |
|---|---|
| Example 1 | |
| No "Magnetic Hook" | 0.60 |
| Magnetic Hook Catalyst | 2.67 |
| Example 2 | |
| AKC No. 1 | 3.00 |
| AKC No. 2 | 4.21 |
| Example 5 | |
| No Magnetic Hook | 0.60 |
| Low Magnetic Hook | 1.16 |
| Intermediate Magnetic Hook | 4.23 |
| High Magnetic Hook | 4.97 |
| Example 6 | |
| No Magnetic Hook | 0.82 |
| Low Magnetic Hook | 2.46 |
| Intermediate Magnetic Hook | 4.07 |
| High Magnetic Hook | 4.55 |
| Example 7 | |
| No Magnetic Hook | 35.6 |
| Plus Magnetic Hook | 45.7 |
| Increase with Magnetic Hook | 10.1 |
| Example 9 | |
| 18,200 ppm chromium | 1.63 |
| Example 13 | |
| Catalyst A no Magnetic Hook | 0.49 |
| 103,000 ppm Magnetic Hook | 19.0 Δ Increase 19.0 emu/gm |
| 164,000 ppm Magnetic Hook | 33.00 Δ Increase 32.5 emu/gm |
| Catalyst B no Magnetic Hook | 36.3 |
| 101,000 ppm Magnetic Hook | 53.8 Δ Increase 17.5 emu/gm |
| 189,000 ppm Magnetic Hook | 56.5 Δ Increase 20.2 emu/gm |
| Catalyst C no Magnetic Hook | 0.39 |
| 66,000 ppm Magnetic Hook | 17.7 Δ Increase 17.3 emu/gm |
| 171,000 ppm Magnetic Hook | 24.6 Δ Increase 24.2 emu/gm |

Figure 19:
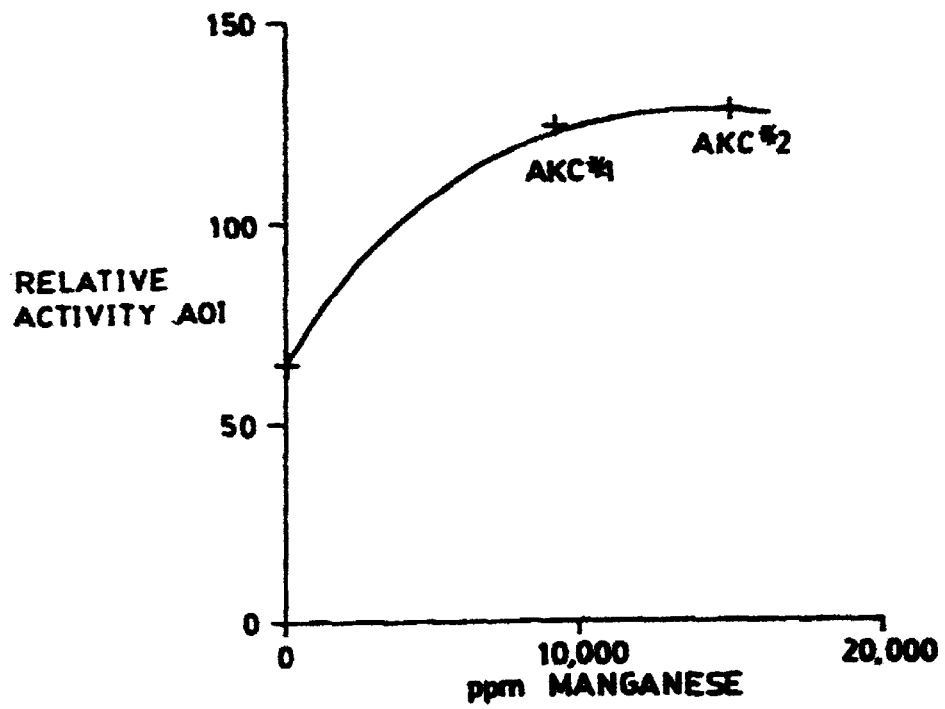
FIG. 19 is a plot of AOI relative activity versus manganese content. (Example 2, Table 3a.)

FIG. 19 shows the steam stability enhancement of activity of various manganese contents.

Figure 20:
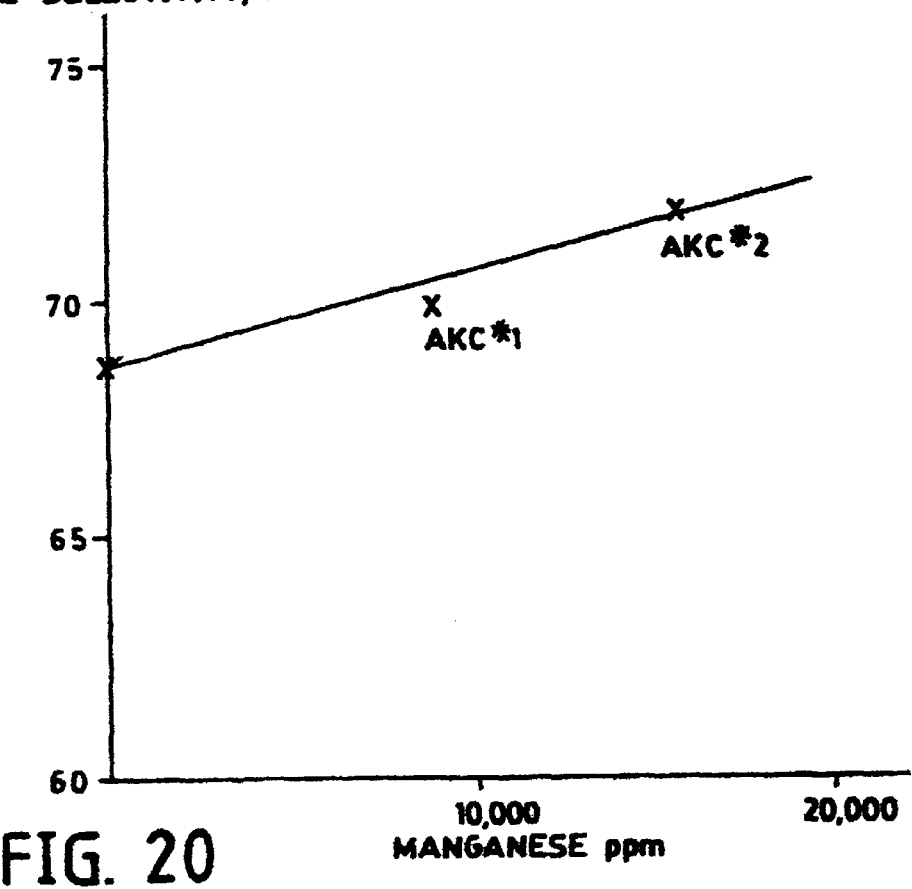
FIG. 20 is a plot of selectivity versus manganese content. (See Example 2 and Table 3a.)

FIG. 20 shows the effect of manganese content on selectivity, weight percent selectivity versus various manganese contents.

EXAMPLE 17

Low Levels of Mn

In a manner similar to that employed in Example 2, a composition of matter is compared comprising microspheres in the range of 5 to 200 microns in average diameter and containing about 50–900 ppm Mn. During the process of manufacture, the content of Mn is monitored by measuring magnetic susceptibility in a Johnson-Matthey or other magnetic susceptibility balance. The content of manganese is found to be essentially directly proportional to the magnetic susceptibility, thus providing a convenient method of measuring manganese content. (See FIG. 21.)

When this catalyst is circulated in a fluid catalytic cracking unit for selectively converting hydrocarbons to gasoline, a substantial increase in micro activity (MAT) even at these low levels of Mn. (See FIGS. 19 and 20.)

FIG. 22 shows relative activity versus weight percent manganese.

FIG. 23 shows gasoline selectivity versus weight percent conversion using catalyst containing manganese and catalyst with no manganese addition.

FIG. 24 shows gasoline selectivity versus weight percent manganese on catalyst at 75% conversion.

MODIFICATIONS

Specific compositions, methods of manufacture or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. In particular preferred embodiments, the fresh catalyst can be added to circulating catalyst in a fluid catalytic cracking unit and the fresh catalyst can comprise 0.1 to 20 wt. % Mn and/or at least 1000 ppm Cr. For particularly preferred embodiments, the catalyst will be substantially free of bismuth (Bi). It is especially preferred to add ZSM-5 or other paraffin-selective cracking catalyst together with about 0.1 to 20 wt. % of manganese and/or at least 1000 ppm Cr. Mn valence states of +2, +3, +4, +6 and +7; and Cr states of +2, +3, and +6 are suitable, though valence states will sometimes change during the FCC cycle. Zeolite use can be any of those previously used in catalyst formulations, but ZSM-5 manufactured by Mobile is particularly preferred as set out in Example 6/Table 6. Even higher levels of Mn, above 0.2 wt. % based on Table A or 0.24 wt. % based on Table 5a can be utilized.

A number of suitable manganese compounds are shown on pages 135–139 of Stream Catalogue #16 and a number of suitable chromium compounds are shown at pages 61–63 of Stream Catalogue #16. These manganese and chromium compounds include: manganese nitrate, manganese acetate, manganese octoate, manganese naphthenate, manganese acetylacetonte, manganese lactate and manganese pyrophosphate, and manganese compounds selected from the group consisting of manganese carbonate, manganese chloride, and mixtures thereof, and chromium compounds selected from the group consisting of chromium nitrate, chromium acetate, chromium carbonate, chromium chloride, and mixtures thereof Other embodiments of this invention include preferred methods of making and using the catalyst, as well as the catalyst produced by these preferred methods. one preferred method involves combining a solution of manganese salt with other catalyst ingredients, followed by spray drying the resulting mixture, washing said spray-dried particles to remove undesirable cation or anion contaminants in drying for shipment. In other embodiments, the catalyst might comprise 0.05 to 20 wt. % manganese and/or chromium, formed by impregnating spray-dried catalyst with manganese and/or chromium containing compounds. The selective catalyst can be made by contacting dried catalyst with methylcyclopentadienyl manganese tricarbonyl. It is also possible to impregnate dried catalyst with a colloidal water suspension of manganese and/or chromium oxide. Catalyst may also be prepared by continuous or periodic addition of a water or organic solution of manganese or chromium salts or methyl cyclopentadienyl manganese tricarbonyl to circulating catalysts in a hydrocarbon conversion process to a level of about 0.05–20 wt. % manganese and/or chromium as reached.

Preferably the virgin catalyst possesses a magnetic susceptibility of greater than about $1 \times 10^{-6}$ emu/g.

Catalyst may also be prepared by combining a solution of manganese or chromium salts with other catalyst ingredients, followed by spray drying the resulting mixture, to form particles, washing said particles to remove cation or anion contaminants and drying.

In another embodiment, the catalyst may comprise manganese and/or chromium deposited into the outer periphery of a microsphere.

Preferably, the catalyst has a matrix with cracking activity.

In another embodiment, the catalyst may be first calcined at a temperature of 500° F. or higher, and thereafter depositing into said microsphere 0, 0.05 to 20 wt. % manganese and/or chromium. The catalyst may be spray dried prior to deposit of manganese or chromium. The chromium and/or manganese may be added from a solution. The solution may comprise a nitrate, sulfate, chloride, acetylacetonate, or acetate of chroming and/or manganese. The solution may also contain manganese II acetylacetonate, manganese III acetylacetonate an carbonate chromium acetylacetonate, manganese carbonate and manganese acetate.

Reference to documents made in the specification is intended to result in such patents or literature being expressly incorporated herein by reference.

What is claimed is:

1. A composition of matter for selectively converting hydrocarbons to gasoline comprising microspheres in the range of 5 to 200 microns comprising at least about 5200 ppm Mn and about 5% or more zeolite selected from the group consisting of: X, Y, USY and ZSM-5 and additionally comprising a matrix.

2. A composition according to claim 1 additionally comprising Ni+V and having a weight ratio of at least 0.5 Mn: (Ni+V) on catalyst.

3. A composition according to claim 1 in which Mn is deposited substantially uniformly throughout the microspheres.

4. A composition according to claim 1 in which cracking activity exists in both the zeolite and the matrix.

5. A composition of matter according to claim 1 comprising at least 5200 ppm Mn and additionally comprising about 0.1–20 wt. % Cr on the catalyst.

6. A composition of matter according to claim 1 comprising 1 to 15 wt. % Cr.

7. A composition of matter according to claim 1 comprising about 5 to 50 wt. % ZSM-5.

8. A composition of matter according to claim 1 consisting essentially of at least 5200 ppm Mn and 5% or more zeolite X, Y, USY, or ZSM-5.

9. A composition of matter for selectively converting hydrocarbons to gasoline according to claim 1 comprising microspheres in the range of 5 to 200 microns and further comprising at least 0.5 wt. % Na.

10. A composition according to claim 1 wherein the catalyst comprises at least 0.05–10% rare earth.

11. A composition according to claim 1 having a magnetic susceptibility of at least $2 \times 10^{-6}$ emu per gram when measured on a Johnson Mathey balance.

12. A process for preparing a selective catalytic cracking catalyst comprising about 5% or more of a zeolite selected from the group consisting of X, Y, USY and ZSM-5 and at least 5200 ppm Mn in a microspherical cracking catalyst comprising mixing a manganese compound with a cracking catalyst to form said microspherical catalyst.

13. A process according to claim 12 wherein the manganese compound comprises at least one of the following precursors: manganese (II) carbonate, manganese (II) octoate, manganese (II) acetate tetrahydrate, manganese (II) acetate, manganese (III) acetate, manganese (II) fluoride, manganese (III) fluoride, manganese (II) iodide, manganese (II) methoxide, manganese (II) naphthenate, manganese (II) nitrate, manganese (III) nitrate, manganese (III) orthophosphate, manganese (III) oxalate, manganese (II) 2,4-pentanedionate, manganese (III) 2,4-pentanedionate, manganese (II) perchlorate, manganese (II) phosphate, manganese (II) phthalocyanine, manganese (II) sulfate, MMT, and optionally adding chromium to the solution as chromium (II) acetate, chromium (III) acetate hydroxide, chromium (III) acetylacetonate, chromium (III) bromide, chromium (II) chloride, anhydrous chromium (III) fluoride, chromium (III) hexafluoro 2,4-pentanedionate, chromium (III) iodide, chromium (II) iodide, anhydrous chromium (III) nitrate, chromium (III) 2,4-pentadionate, chromium (III) perchloate, chromium (III) phosphate, chromium (III) sulfate, and/or chromocene.

14. A process according to claim 12 wherein the catalyst comprises at least 0.84 wt % Mn.

15. A process according to claim 12 wherein the manganese compound is added to a hydrocarbon feedstock to be cracked and deposits on the catalyst at a level above 5200 ppm Mn.

16. A process according to claim 12 wherein the catalyst comprises at least 0.05–10% rare earth.

17. A process according to claim 12 in which the Mn comprises salt solutions of nitrate, sulfate, chloride, carbonate or acetate of Mn.

18. A process according to claim 12 comprising depositing Mn substantially on the outer shell of the microsphere or uniformly throughout the microsphere or a combination of both.

19. A process according to claim 12 for preparing a selective cracking catalyst, said process comprising adding at least a portion of said Mn as Mn acetate.

20. A process according to claim 12, said process further comprising exchanging or impregnating spray-dried catalyst with Mn solution and drying.

21. A process according to claim 12 for preparing a selective cracking catalyst by incorporating zeolite and 5200 ppm to 20 weight % Mn in a microspherical cracking catalyst, said process further comprising mixing a Mn solution with gelled catalyst and spray drying.

22. A process according to claim 12 for preparing a selective cracking catalyst by incorporating zeolite and 5200 ppm to 20 weight % Mn in a microspherical cracking catalyst, said process further comprising mixing a solution of Mn salts and spray-drying the mixture.

23. A process according to claim 12 further comprising preloading the zeolite with a solution of Mn, and spray drying.

24. A process according to claim 12 further comprising impregnating calcined catalyst with Mn.

* * * * *